US007917087B2

(12) United States Patent
Harumoto

(10) Patent No.: US 7,917,087 B2
(45) Date of Patent: Mar. 29, 2011

(54) WIRELESS COMMUNICATION SYSTEM AND IMAGE FORMING DEVICE

(75) Inventor: Katsumi Harumoto, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 864 days.

(21) Appl. No.: 10/359,209

(22) Filed: Feb. 6, 2003

(65) Prior Publication Data

US 2004/0203413 A1 Oct. 14, 2004

(30) Foreign Application Priority Data

Jun. 17, 2002 (JP) ................................ 2002-175535

(51) Int. Cl.
*H04B 7/00* (2006.01)

(52) U.S. Cl. ............... 455/41.2; 347/6; 347/19; 347/86; 399/12

(58) Field of Classification Search .................... 347/19, 347/6, 86; 455/41.2, 66.1; 399/12
See application file for complete search history.

(56) References Cited

U.S. PATENT DOCUMENTS 4,853,708 A * 8/1989 Walters ........................... 347/86
4,961,088 A * 10/1990 Gilliland et al. ................ 399/25
4,963,939 A * 10/1990 Kurando et al. ................ 399/12
5,955,951 A * 9/1999 Wischerop et al. ........ 340/572.8
6,144,812 A * 11/2000 Ueno .............................. 399/12
6,312,106 B1 * 11/2001 Walker ............................ 347/50
6,381,419 B1 * 4/2002 Kinoshita et al. ............... 399/27
6,385,407 B1 * 5/2002 Inose .............................. 399/24
6,393,226 B1 * 5/2002 Charlebois et al. ............. 399/12
6,404,995 B1 * 6/2002 Kimizuka ....................... 399/13
6,490,422 B2 * 12/2002 Harumoto ....................... 399/27
6,610,379 B1 * 8/2003 Adams et al. ................ 428/40.1
6,644,771 B1 * 11/2003 Silverbrook .................... 347/19
6,658,219 B1 * 12/2003 Ito et al. .......................... 399/27
6,807,380 B2 * 10/2004 Iida et al. ........................ 399/12
6,938,976 B2 * 9/2005 Siwinski et al. ................ 347/19
2001/0019667 A1 * 9/2001 Yamashita ...................... 399/27
2001/0054962 A1 * 12/2001 Barber et al. .............. 340/573.2
2002/0021909 A1 * 2/2002 Harumoto ....................... 399/27
2002/0060629 A1 * 5/2002 Pfeiffer et al. ............ 340/572.8

FOREIGN PATENT DOCUMENTS

GR WO97/38364 * 4/1997
GR WO9738364 * 4/1997
JP A 2001-22230 1/2001
JP A 2001-324091 11/2001
JP A 2002-062784 2/2002
WO WO9738364 * 4/1997

* cited by examiner

*Primary Examiner* — Zhiyu Lu
(74) *Attorney, Agent, or Firm* — Oliff & Berridge, PLC

(57) ABSTRACT

Tag attaching portions at cartridge parts which are loaded into different cartridge loading portions have common structures and configurations. A position of a wireless communication tag at the cartridge part is easily adjusted to a position suited for communication with a main body antenna. In a laser printer, accommodating chambers and accommodating portions are provided at plural regions of toner cartridges. The wireless communication tag is selectively inserted and fit into one of the accommodating chambers and accommodating portions, in accordance with a position of the cartridge loading portion in which the toner cartridge is loaded. In this way, in a state in which the toner cartridges are respectively loaded in the cartridge loading portions, the wireless communication tags are substantially parallel to and sufficiently close to the main body antennas of antenna units.

6 Claims, 15 Drawing Sheets

WIRELESS COMMUNICATION SYSTEM AND IMAGE FORMING DEVICE

BACKGROUND OF THE INVENTION

1. Field of the Invention

The present invention relates to a wireless communication system which can be applied to various types of devices in which plural cartridge parts can be removably loaded in a device main body, and to an image forming device (such as a copier, a facsimile machine, a printer or the like) in which plural cartridge parts can be removably loaded in a device main body.

2. Description of the Related Art

Among image forming devices using an electrophotographic process such as a copier, a laser printer or the like, there are image forming devices in which the container which houses toner is structured as a toner cartridge in order to facilitate maintenance of the device. In such an image forming device, when all of the toner has been discharged from the interior of the toner cartridge, the user replaces the toner cartridge with a new one so as to replenish the toner. At this time, in most cases, the used toner cartridge which has been removed from the image forming device is returned by the user to the manufacturer of the image forming device. After undergoing recycling processes by the manufacturer such as inspection, cleaning, replacement of worn-out parts, refilling of toner and the like, the toner cartridge is again shipped to the user. When such an image forming device can form color images, respectively different types of toner cartridges (e.g., four types corresponding to black, cyan, magenta, and yellow) are loaded in cartridge loading sections provided at different regions in the device main body. Toners of respectively different colors are supplied from these toner cartridges to the device main body.

Moreover, among such image forming devices, there are those in which a developing device, a cleaning device, a charging device and the like are provided as process parts relating to the image creating process (the developing device adheres toner to a electrophotographic photosensitive body (hereinafter simply called "photosensitive body"); the cleaning device recovers the residual toner after transfer of a toner image from the photosensitive body has been completed; and the charging device charges the image carrying surface of the photosensitive body to a predetermined electric potential), and which are equipped with a process cartridge in which at least one of these process parts is supported integrally with the photosensitive body. The process cartridge is replaced with a new one when the life of any of the structural parts thereof has elapsed. In most cases, the process cartridge which has been removed from the image forming device is returned from the user to the manufacturer, and after undergoing recycling processes by the manufacturer such as inspection, cleaning, replacement of parts whose life has elapsed, and the like, is again shipped to the user who uses the image forming device.

In recent years, such image forming devices have been used in which a tag (a wireless communication tag) having a radio wave communication function and an information storage function is attached to each of the cartridge parts (such as a toner cartridge, a process cartridge, or the like), and a wireless communication device, which is for carrying out input and output of information between the wireless communication tags and the device main body, is provided at the device main body. In such an image forming device, when a cartridge part is loaded in the device main body, the control section of the main body reads information stored on the cartridge tag or writes information onto the cartridge tag, by radio wave communication between the wireless communication device and the cartridge tag. In this way, for example, due to the control section of the main body reading, from the cartridge tag, information corresponding to the type of cartridge part, if a cartridge part which is a different type than the type which should actually be loaded is mistakenly loaded into a predetermined loading section of the device main body, it can be judged that the cartridge part has been mistakenly loaded, and the needed control (error processing or the like) can be carried out. Further, if the control section of the main body is structured so as to write the usage history of the cartridge part, which is based on the number of times image formation has been carried out or the like, onto the wireless communication tag, the manufacturer or the like can read the information relating to the usage history from the wireless communication tag of the cartridge part which has been returned from the user. In this way, the manufacturer or the like can efficiently and accurately carry out inspection work or parts replacement work in the process of recycling the cartridge part.

Among such wireless communication tags mounted to cartridge parts, there are those to which electric power consumed at the time of operation (such as wireless communication, information processing or the like) is supplied by electromagnetic induction from the wireless communication device of the device main body. In this way, there is no need for a power source such as a battery or the like to be provided at the wireless communication tag. This is advantageous from the standpoints of making the wireless communication tag more compact and keeping the cost thereof low.

For example, Japanese Patent Application Laid-Open (JP-A) No. 2001-22230 discloses an image forming device equipped with such wireless communication tags to which electric power is supplied by electromagnetic induction. In this image forming device, a wireless communication tag is attached to each of a process cartridge and a developing cartridge (which is a developing device which has been made into a cartridge part), and a wireless communication device is provided at the device main body.

Here, a main body antenna and tag antennas, which are each formed by winding a thin metal film into a coil form, are provided at the wireless communication device and the wireless communication tags respectively. In this wireless communication system formed from the wireless communication tags and the wireless communication device, the supply of electric power to the wireless communication tags is carried out by electromagnetic induction. In order to reliably carry out radio wave communication by using the weak electric power supplied to the wireless communication tags by electromagnetic induction, the main body antenna of the wireless communication device and the tag antenna of the wireless communication tag oppose one another in a state of being substantially parallel to one another, or in a state of being slightly inclined with respect to the other. Further, there is the need to make the interval between the main body antenna and the tag antenna of the wireless communication tag sufficiently small.

In an image forming device which can form color images, a wireless communication tag is provided at each of the plural types of toner cartridges. In a case in which an attempt is made to carry out radio wave communication between these wireless communication tags and the wireless communication device of the device main body, it has been thought to place the plural toner cartridges symmetrically with respect to the main body antennas in order to reduce the number of places at which the main body antennas are to be provided. In such a case, in order to set the plural tag antennas in the aforementioned positional relationship with respect to the main body antennas, usually, the wireless communication tags must be provided at respectively different regions at the plural types of toner cartridges. Accordingly, in plural types (e.g., four types) of toner cartridges loaded in an image forming device which can form color images, the attaching portions for the wireless communication tags (tag attaching portions) must be made to have a different shape and a different structure for each type of toner cartridge, and it is difficult to use a common configuration and structure for the tag attaching portions. In addition, using a common configuration and structure is desirable from the standpoints of reducing the manufacturing costs of the toner cartridges, facilitating recycling, and the like.

SUMMARY OF THE INVENTION

In view of the aforementioned, an object of the present invention is to provide a wireless communication system in which a common structure and configuration are used for tag attaching portions at cartridge parts which are loaded into respectively different cartridge loading portions, and in which it is easy to adjust the positions of the wireless communication tags at the cartridge parts to positions which are suited for communication with respect to main body antennas, and to provide an image forming device to which this wireless communication system is applied.

In order to achieve the above-described object, in accordance with a first aspect of the present invention, there is provided a wireless communication system applicable to a device having a device main body, a plurality of cartridge loading portions provided at the device main body, and a plurality of cartridge parts removably loadable in the cartridge loading portions, the wireless communication system comprising: (a) a wireless communication tag provided at each cartridge part, the wireless communication tag having a tag antenna, a tag wireless control section carrying out transmission and/or receipt of information in a non-contact manner via the tag antenna, and an information storing element at which reading and/or writing of information are carried out by the tag wireless control section; (b) a plurality of main body antennas provided at regions of the device main body which regions correspond to the cartridge loading portions respectively; (c) a main body wireless control section provided at the device main body, and carrying out transmission and/or receipt of information in a non-contact manner with respect to one corresponding tag wireless control section via one main body antenna and one corresponding tag antenna; and (d) a tag attaching portion for attachment of the wireless communication tag, and provided at one or more places of each cartridge part.

In accordance with another aspect of the present invention, there is provided an image forming device comprising: (I) a device main body including an image forming section; (II) a plurality of cartridge loading portions provided at the device main body; (III) a plurality of cartridge parts removably loadable in the cartridge loading portions; and (IV) a wireless communication system having: (a) a wireless communication tag provided at each cartridge part, the wireless communication tag having a tag antenna, a tag wireless control section carrying out transmission and/or receipt of information in a non-contact manner via the tag antenna, and an information storing element at which reading and/or writing of information are carried out by the tag wireless control section; (b) a plurality of main body antennas provided at regions of the device main body which regions correspond to the cartridge loading portions respectively; (c) a main body wireless control section provided at the device main body, and carrying out transmission and/or receipt of information in a non-contact manner with respect to one corresponding tag wireless control section via one main body antenna and one corresponding tag antenna; and (d) a tag attaching portion for attachment of the wireless communication tag, and provided at one or more places of each cartridge part.

DETAILED DESCRIPTION OF THE PREFERRED EMBODIMENTS

Hereinafter, a laser printer relating to an embodiment of the present invention, and a wireless communication system in the laser printer will be described with reference to the drawings.

(Structure of Laser Printer)

Figure 1:
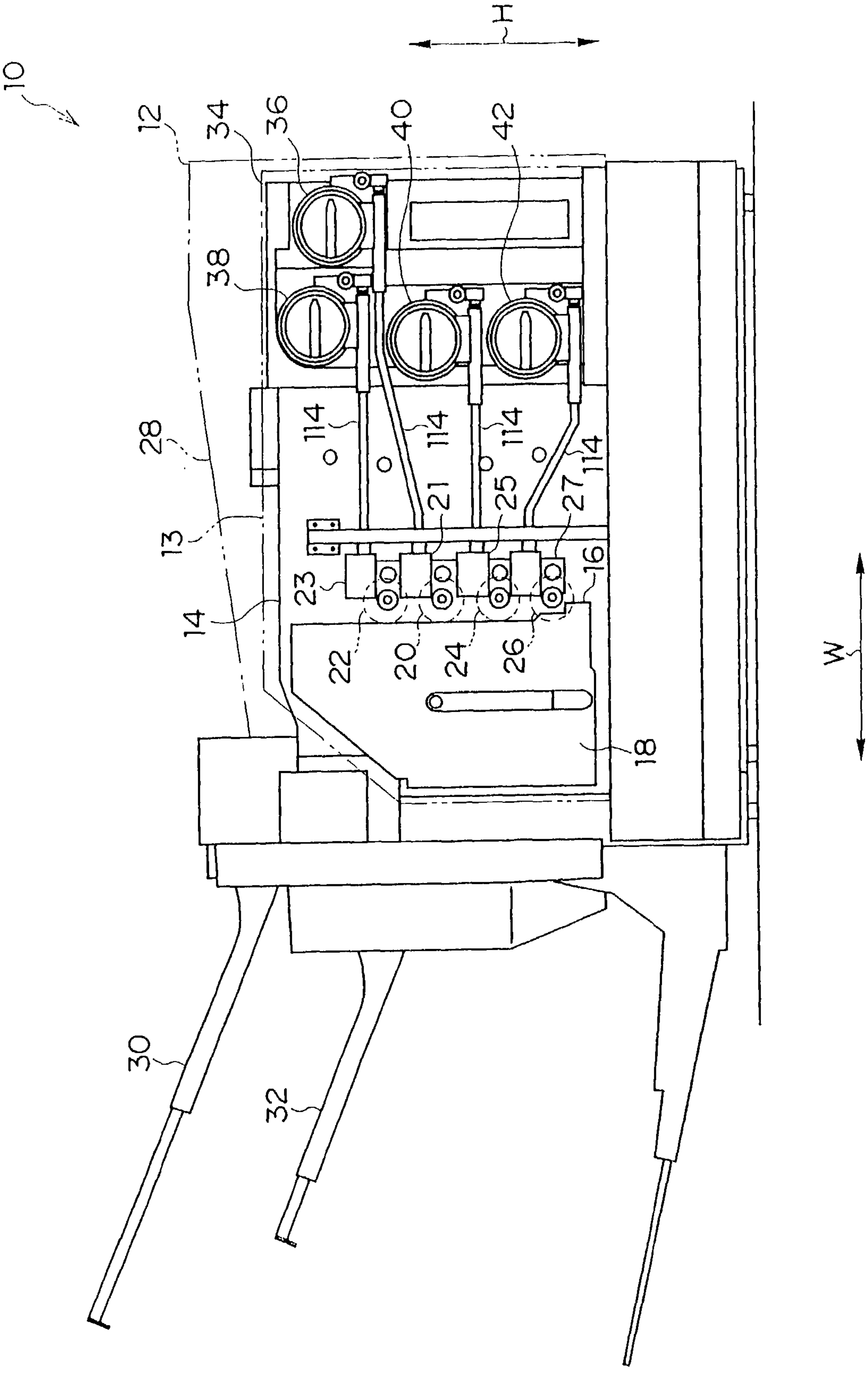
FIG. 1 is a side view showing the structure of a laser printer relating to an embodiment of the present invention.

A laser printer 10, which is equipped with a wireless communication system relating to an embodiment of the present invention, is shown in FIG. 1. By a known electrophotographic process, this laser printer 10 forms an image (a toner image) on the basis of image information inputted from an external device, and records the image on a recording paper or the like. The electrophotographic process is the series of processes of charging an electrophotographic photosensitive body, forming an electrostatic latent image by laser exposure, transferring a toner image, which is formed on the electrophotographic photosensitive body by developing the electrostatic latent image by toners, onto a recording material, and heating and fixing the toner image, so as to record an image on the recording material. Among the processes of the electrophotographic process and the various parts (process parts), such as the electrophotographic photosensitive body and the like, which are directly related to the electrophotographic process, those which are not directly related to the essence of the present invention will not be discussed in great detail. Note that the laser printer 10 relating to the present embodiment can form a color image by using magenta (M), yellow (Y), black (K) and cyan (C) toners.

A case 12 is provided at the laser printer 10 as the outer covering portion of the device. A main frame 14, which is for supporting the respective parts which form the device, is provided within the case 12. A process unit 16 is disposed at one end portion (the left end portion in FIG. 1) along the widthwise direction of the device (the direction of arrow W) in the main frame 14. A sliding frame 18, which is supported by the main frame 14 so as to be slidable along the depthwise direction of the device, is provided at the process unit 16. Predetermined process parts (not illustrated), such as an intermediate transfer belt, a transfer device, a cleaning device, and the like are provided at the sliding frame 18. In this way, when maintenance is carried out, the process unit 16 is pulled-out to the exterior from the main frame 14, so as to simplify the exchange work, the inspection work, and the like of the process parts set at the sliding frame 18.

Four photosensitive drums 20, 22, 24, 26 are supported at the main frame 14 so as to be adjacent to the process unit 16. Four developing devices 21, 23, 25, 27 are disposed in the main frame 14 so as to be adjacent to the photosensitive drums 20, 22, 24, 26, respectively. The four developing devices 21, 23, 25, 27 correspond to toners of magenta (M), yellow (Y), black (K) and cyan (C), respectively, and develop the electrostatic latent images formed on the outer peripheral surfaces (the image carrying surfaces) of the photosensitive drums 20, 22, 24, 26 as respective toner images by M toner, Y toner, K toner and C toner.

The toner images formed on the four photosensitive drums 20, 22, 24, 26 are transferred onto the intermediate transfer belt provided at the process unit 16 such that they are superposed on one another, so as to form a full-color toner image. After the full-color toner image is transferred from the intermediate transfer belt onto a recording material such as a recording paper or the like, the full-color toner image is heated and fixed, so as to be recorded on the recording material. At the laser printer 10, it is also possible to record a monochromatic toner image, which is formed only by K toner, on a recording material. The recording material on which the toner image is recorded is conveyed along a predetermined conveying path (not shown), and is discharged onto a discharged paper tray portion 28 formed on the top surface of the case 12, or is discharged onto discharged paper trays 30, 32 attached to a side surface of the case 12 so as to extend out toward the side.

Figure 2:
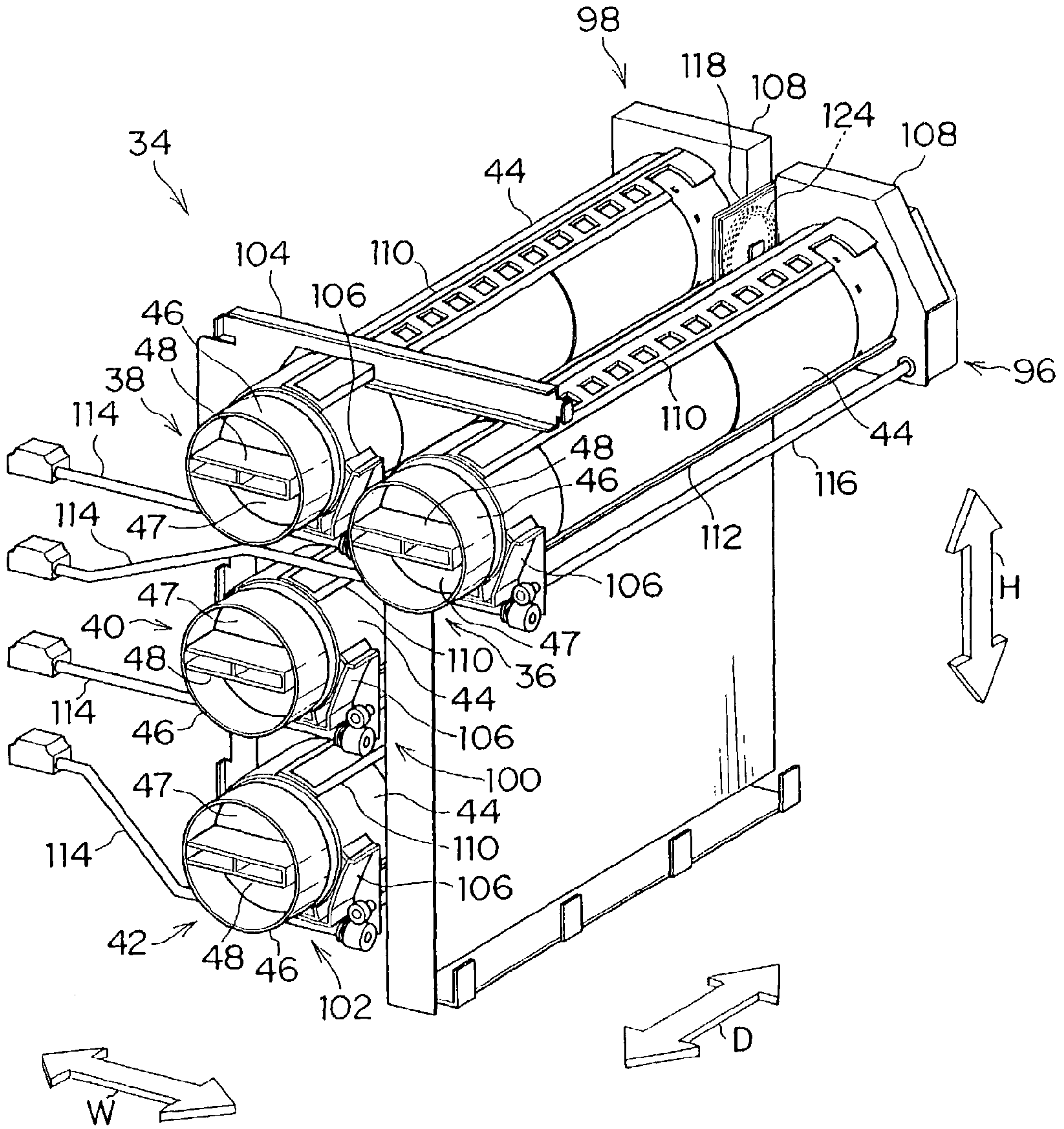
FIG. 2 is a perspective view showing the structure of a cartridge holder in which toner cartridges are removably loaded, in the laser printer shown in FIG. 1.

A cartridge holder 34 is provided at the laser printer 10, adjacent to the main frame 14 along the widthwise direction. As shown in FIG. 2, four toner cartridges 36, 38, 40, 42, each of which is formed in a substantially cylindrical shape, are removably loaded in the cartridge holder 34. Toners of different colors (a magenta (M) toner, a yellow (Y) toner, a black (K) toner, and a cyan (C) toner) are filled in the toner cartridges 36, 38, 40, 42, respectively.

As shown in FIG. 1, an opening/closing door 13 for maintenance is provided at the case 12 so as to oppose the process unit 16 and the cartridge holder 34 at one side surface of the case 12 (the side surface which is toward the front in the direction orthogonal to the surface of the drawing of FIG. 1). In this way, by a user or the like opening the opening/closing door 13 and exposing the process unit 16 and the cartridge holder 34 to the exterior, the process unit 16 can be pulled out from the main frame 14 to the exterior, and the toner cartridges 36, 38, 40, 42 can respectively be attached to and removed from the cartridge holder 34.

The toner cartridges 36, 38, 40, 42 which are loaded in the cartridge holder 34 are formed as containers for temporarily housing the toners. Namely, at the laser printer 10, when the developing devices 21, 23, 25, 27 are operating, the toners are discharged from the toner cartridges 36, 38, 40, 42, and the toners are supplied to the developing devices 21, 23, 25, 27. When all of the usable toner filled within the toner cartridges 36, 38, 40, 42 is discharged, the toner cartridges 36, 38, 40, 42 are replaced with new ones. At this time, because the toners are sealed within the toner cartridges 36, 38, 40, 42, the replenishing of toner to the laser printer 10 is carried out by a simple operation, and it is possible to effectively prevent dirtying of the interior and the exterior of the device due to toner scattering at the time when the toners are replenished.

Figure 7:
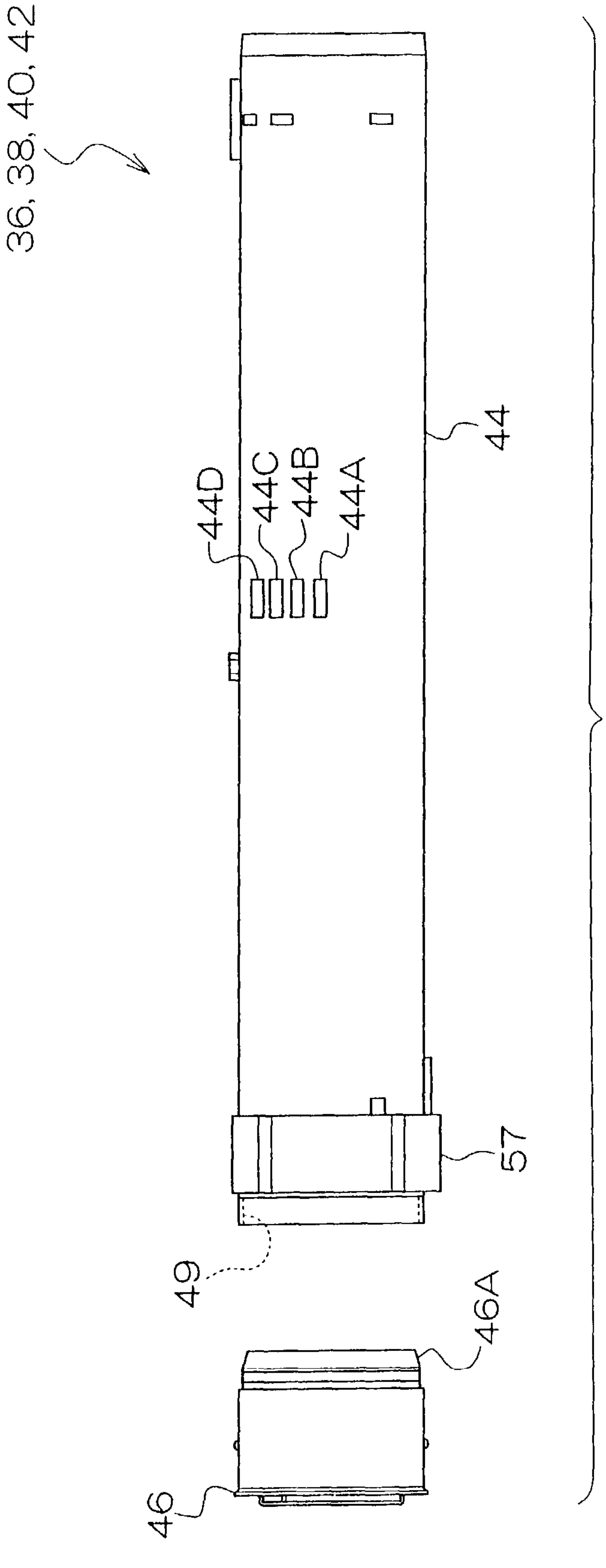
FIG. 7 is a side view showing an example of the toner cartridge in a wireless communication system relating to the embodiment of the present invention, and shows a state before a closing cover has been attached to a tubular body.

As shown in FIG. 2, each of the toner cartridges 36, 38, 40, 42 has a tubular body 44 which is formed as a thin-walled cylindrical tube of a resin material. An opening/closing port 49 (see FIG. 7) which communicates with the interior is provided at one end surface along the axial direction of the tubular body 44 (the rear end surface). The opening/closing port 49 of the tubular body 44 is closed by a closing cover 46 which is formed of resin and is formed in a tubular shape. A taper portion 46A (see FIG. 7), whose diameter narrows toward the distal end, is formed at one end portion of the closing cover 46. This taper portion 46A is press-fit through the opening/closing port 49 into the tubular body 44. The inner peripheral side of the closing cover 46 is closed by a disc-shaped bottom plate portion 47 (see FIG. 2). A plate-shaped handle portion 48 is molded integrally within the closing cover 46, at the outer side of the bottom plate portion 47.

Figure 3:
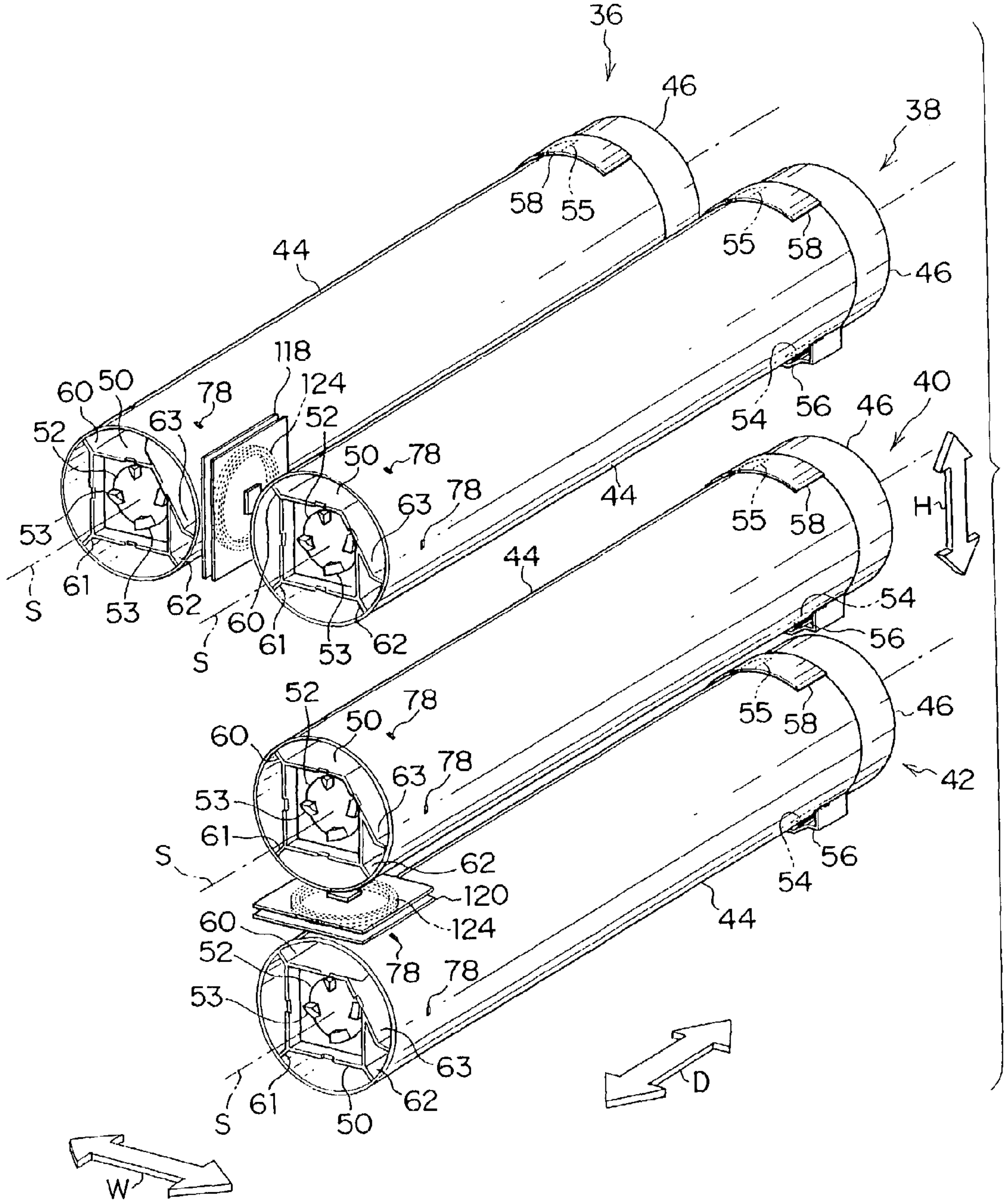
FIG. 3 is a perspective view showing the structure of the toner cartridges and antenna units of a wireless communication device, in the laser printer shown in FIG. 1.
Figure 4:
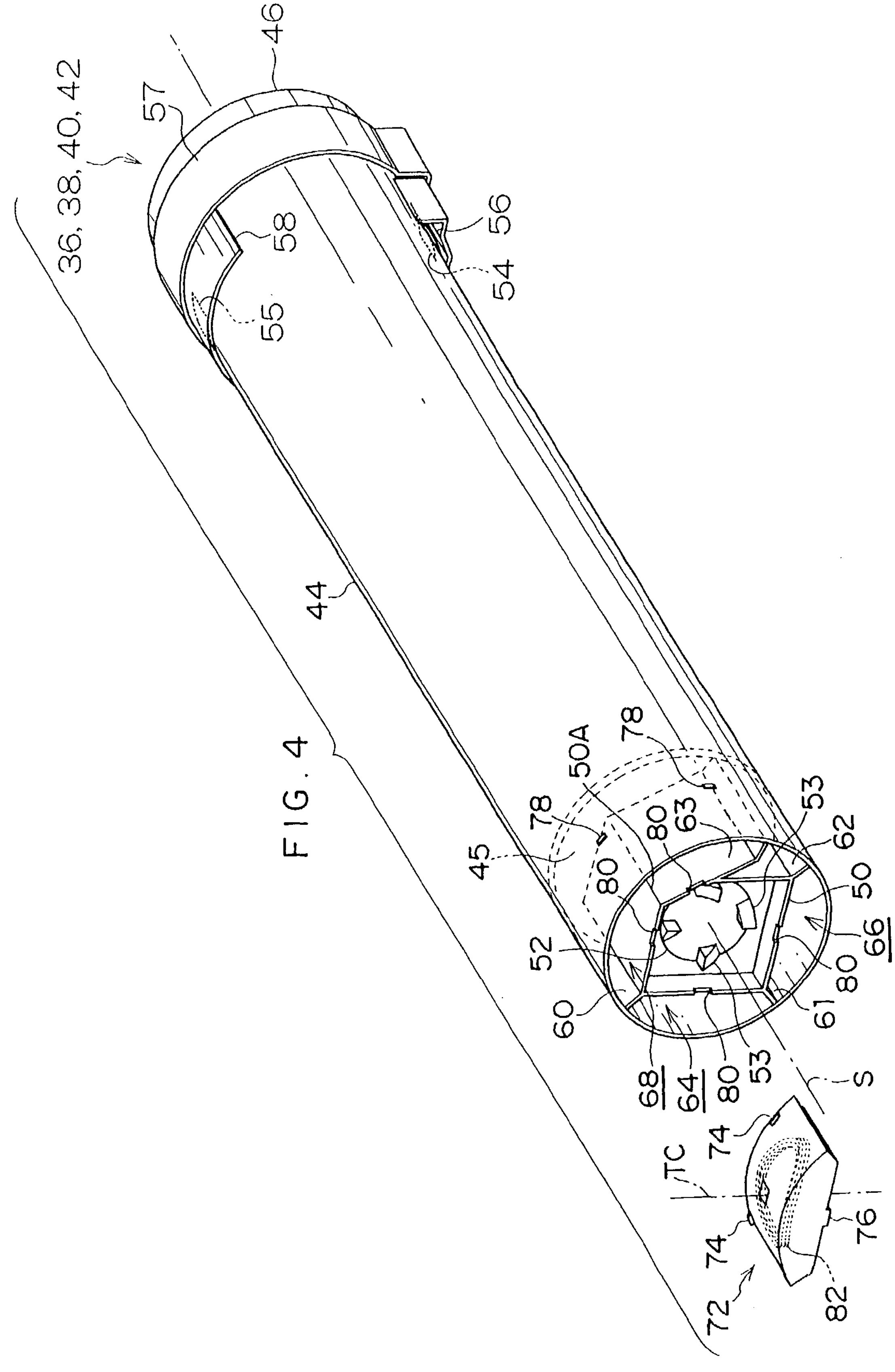
FIG. 4 is an exploded perspective view showing the structure of the toner cartridge and a wireless communication tag attached to the toner cartridge, in the laser printer shown in FIG. 1.

As shown in FIG. 3 and FIG. 4, an inner peripheral tube portion 50, whose cross-sectional configuration is substantially rectangular, is provided integrally at the inner peripheral side of the peripheral wall portion of the distal end portion (or front end portion) of the tubular body 44. A disc-shaped driven connecting plate 52 is set, so as to be rotatable around an axial center S of the tubular body 44, at the bottom plate portion of the inner peripheral tube portion 50. A plurality of meshing claws 53 are formed integrally along the peripheral direction at the front surface side of the driven connecting plate 52. On the other hand, a screw feeder (not shown) for conveying toner, which is formed in the shape of a screw shaft, is rotatably supported coaxially within the tubular body 44. The screw feeder is connected to the driven connecting plate 52, and rotates integrally with the driven connecting plate 52.

Figure 9:
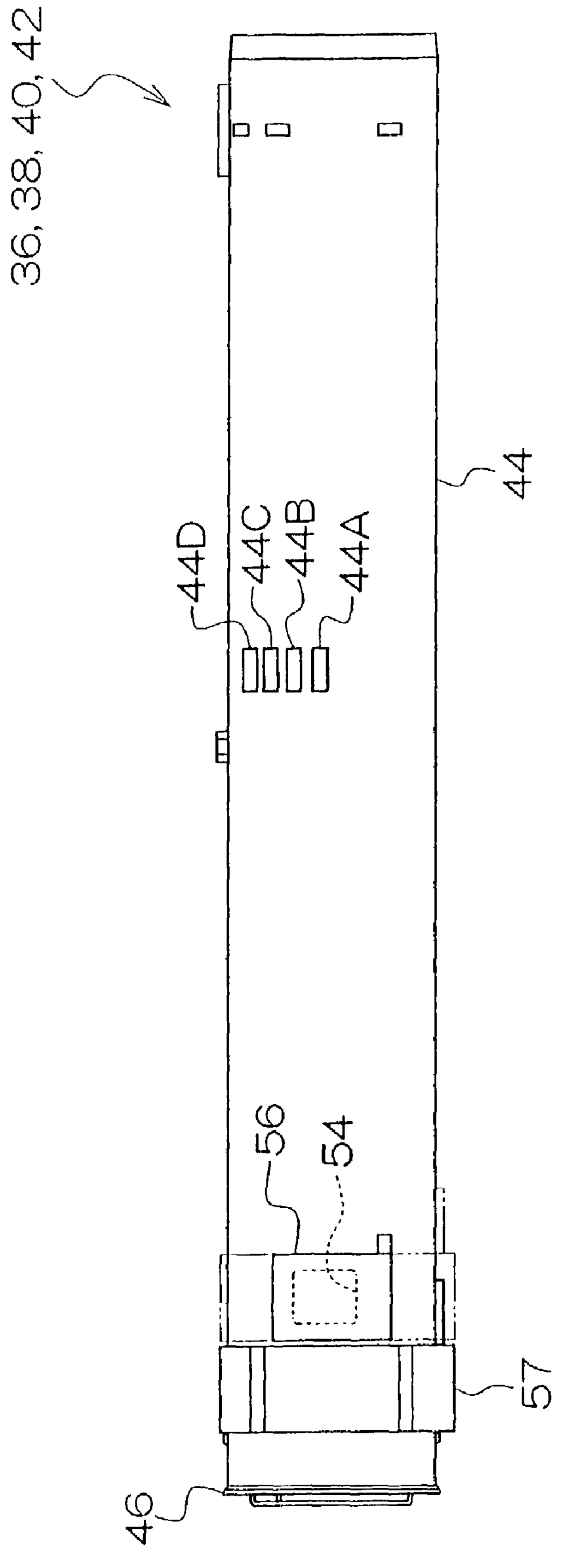
FIG. 9 is a side view showing an example of the toner cartridge in the wireless communication system relating to the embodiment of the present invention, and shows a state in which a sliding cover has been slid to a standby position.
Figure 10:
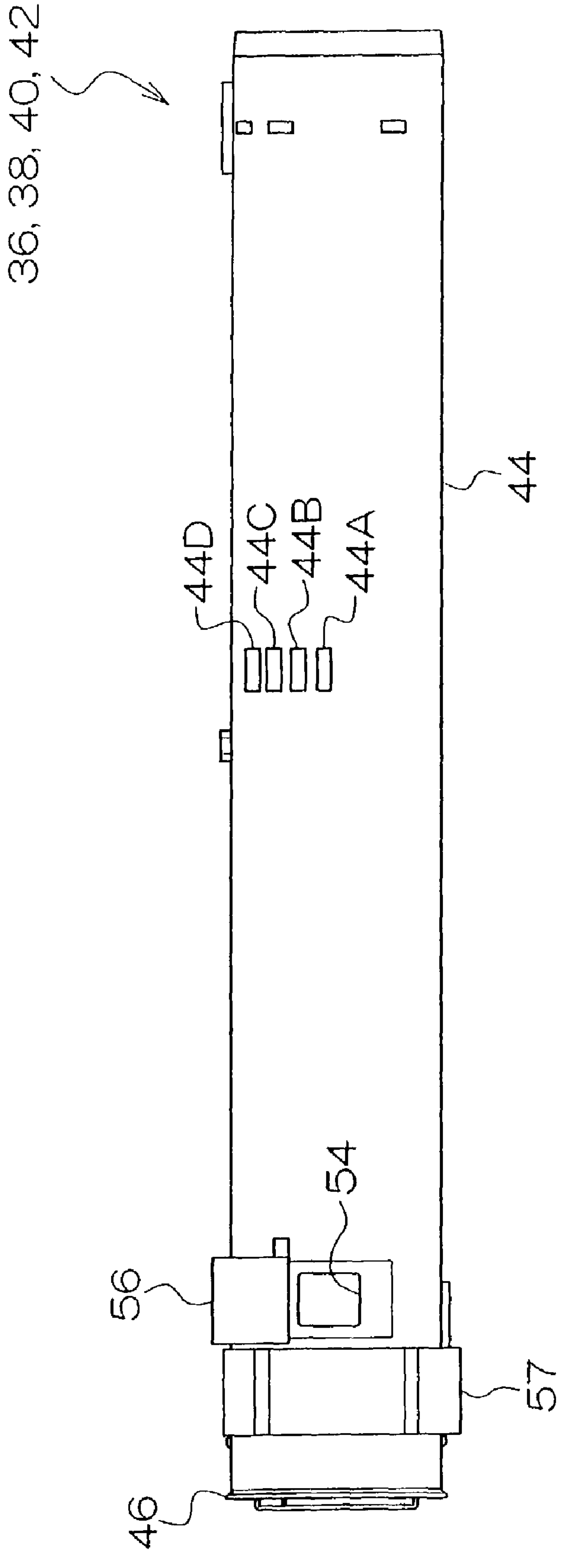
FIG. 10 is a side view showing an example of the toner cartridge in the wireless communication system relating to the embodiment of the present invention, and shows a state in which an opening/closing shutter has been slid to an open position.

As shown in FIG. 4, a toner supplying port 54 and a toner filling port 55 are formed at the distal end side of the tubular body 44 in the peripheral wall portion thereof. As shown in FIGS. 9 and 10, a plate-shaped shutter member 56, which is slidable along the peripheral direction, is disposed at the outer peripheral side of the toner supplying port 54. The shutter member 56 is slidable between a closed position (see FIG. 9) at which the shutter member 56 closes the toner supplying port 54, and an open position (see FIG. 10) at which the shutter member 56 opens the toner supplying port 54. The shutter member 56 is always urged toward the closing position by an urging member (not shown) such as a coil spring or the like. In this way, in the state in which the toner cartridges 36, 38, 40, 42 are loaded in the cartridge holder 34, the shutter members 56 are held at the closed positions. Further, a cap member 58 is fixed to the outer peripheral side of the toner filling port 55 at the peripheral wall portion of the tubular body 44, so as to close the toner filling port 55.

Figure 8:
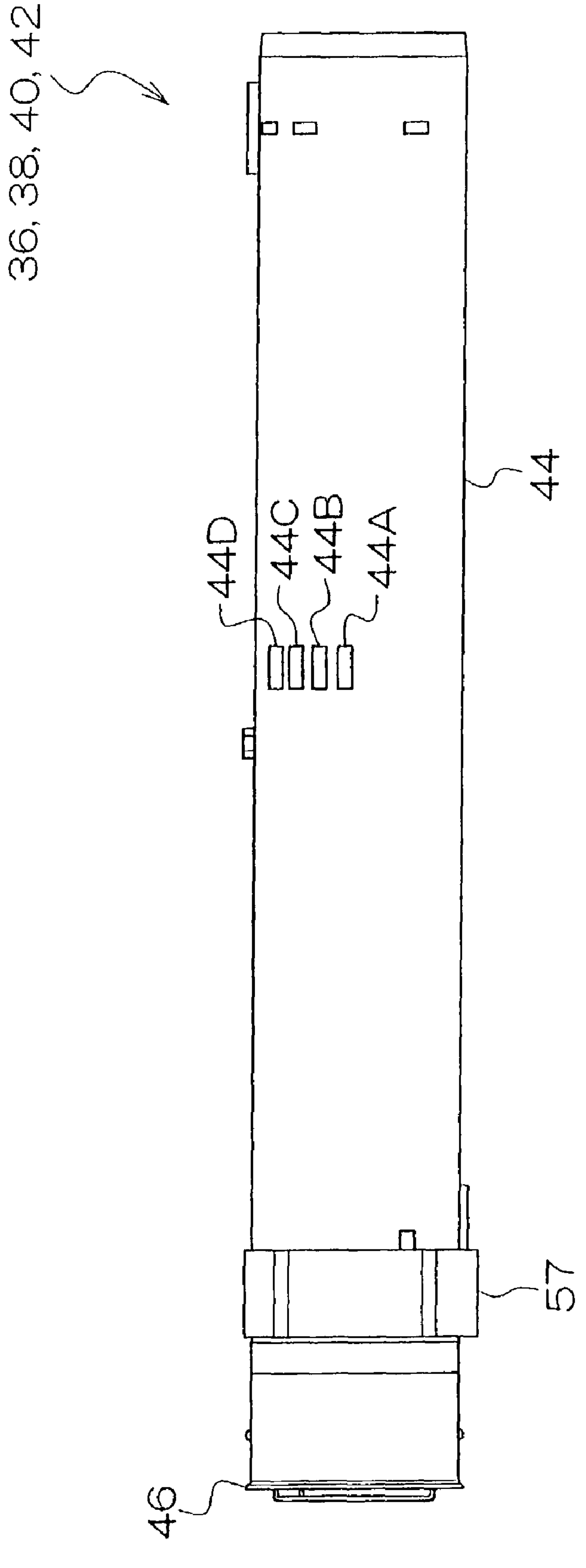
FIG. 8 is a side view showing an example of the toner cartridge in the wireless communication system relating to the embodiment of the present invention, and shows a state in which the closing cover has been attached to the tubular body.

Further, as shown in FIGS. 8 and 9, a sliding cover 57, which is thin-walled and tubular, is disposed so as to be slidable along the axial direction at the outer peripheral side of the distal end portion of the tubular body 44. The sliding cover 57 is slidable between a covering position (see FIG. 8) at which the sliding cover 57 covers the shutter member 56 and the cap member 58 from the outer peripheral side, and a standby position (see FIG. 9) at which the sliding cover 57 is slid toward the closing cover 46 side with respect to the shutter member 56 and the cap member 58. The sliding cover 57 is always urged toward the covering position by an urging member (not shown) such as a coil spring or the like. In this way, in the state in which the toner cartridges 36, 38, 40, 42 are not loaded in the cartridge holder 34, the sliding covers 57 are held at the covering positions. Note that in the drawings other than FIGS. 3, 7, 8, 9 and 10, in order to simplify explanation, the toner cartridges 36, 38, 40, 42 are illustrated with the sliding covers 57 omitted.

As shown in FIG. 4, four partitioning plates 60, 61, 62, 63 are formed in rib-shapes at the rear end portion of the tubular body 44, so as to connect the peripheral wall portion of the tubular body 44 and the inner peripheral tube portion 50, within the space formed between the inner peripheral surface of the peripheral wall portion of the tubular body 44 and the outer peripheral surface of the inner peripheral tube portion 50. The partitioning plates 60, 61, 62, 63 partition the ring-like space, which is formed between the peripheral wall portion of the tubular body 44 and the inner peripheral tube portion 50, into small spaces along the peripheral direction. These small spaces open toward the distal end surface of the tubular body 44, and the rear end sides thereof are closed by the bottom plate portion 45 of the tubular body 44.

Figure 5:
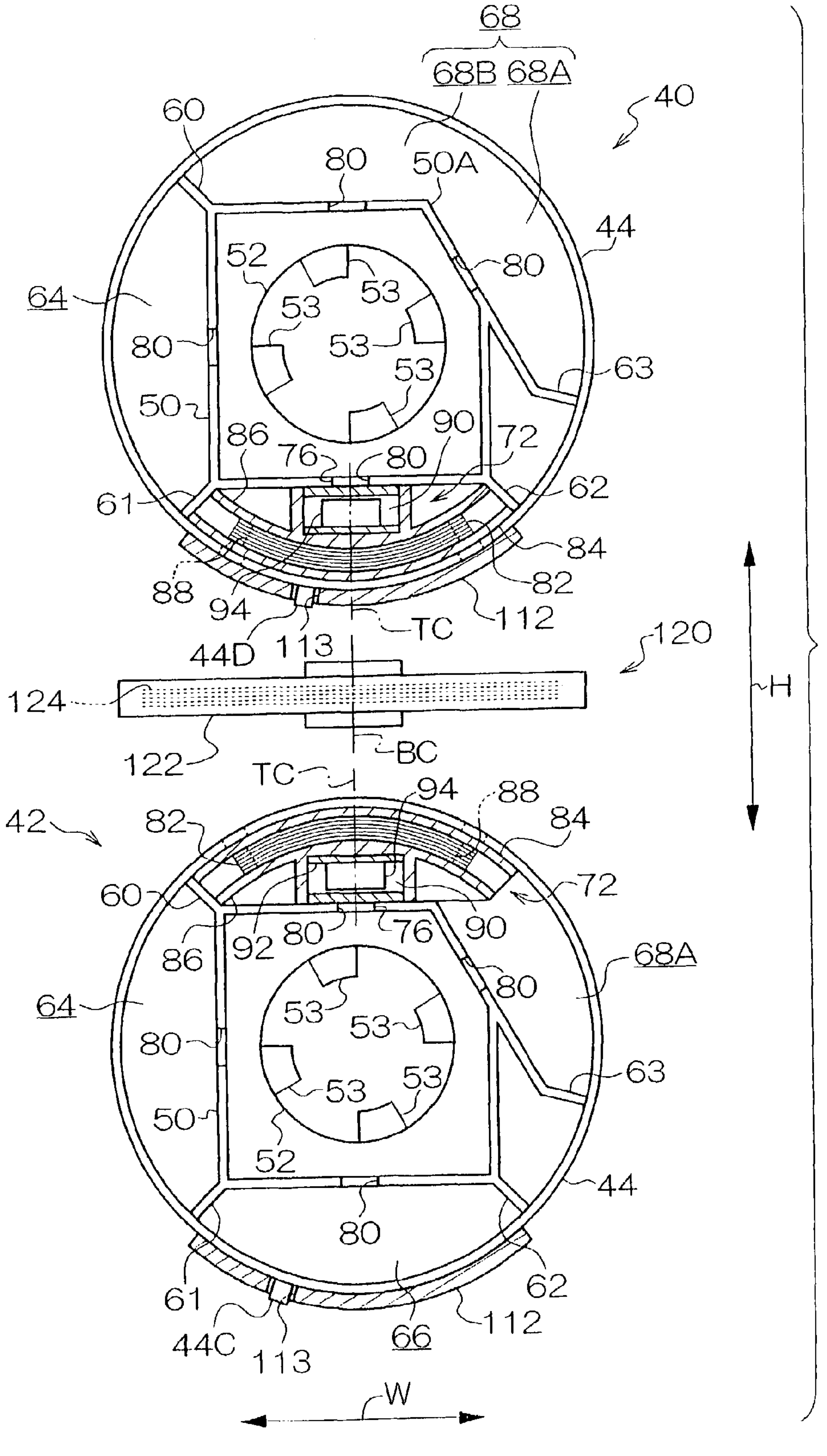
FIG. 5 is a front view, as seen from an axial direction outer side, of the wireless communication tags attached to the toner cartridges and the antenna unit of the wireless communication device, in the laser printer shown in FIG. 1.

Here, the small space between the partitioning plate 60 and the partitioning plate 61 within the tubular body 44, and the small space between the partitioning plate 61 and the partitioning plate 62 are formed as accommodating chambers 64, 66 for each accommodating one wireless communication tag 72 (see FIG. 4) which will be described later. Moreover, the small space between the partitioning plate 60 and the partitioning plate 63 also is formed as an accommodating chamber 68 which accommodates one wireless communication tag 72. However, as shown in FIG. 5, the accommodating chamber 68 is functionally divided, with a vicinity of an edge portion 50A of the inner peripheral tube portion 50 serving as the boundary, into an accommodating portion 68A and an accommodating portion 68B. In the accommodating chamber 68, the wireless communication tag 72 can be selectively accommodated in either of the two accommodating portions 68A, 68B. Accordingly, one wireless communication tag 72 is selectively accommodated in any one of the accommodating chamber 64, the accommodating chamber 66 and the two accommodating portions 68A, 68B of the accommodating chamber 68. The position of attachment varies along the peripheral direction in accordance with the selected accommodating chamber 64, 66 or accommodating portion 68A, 68B.

As shown in FIG. 4, the wireless communication tag 72 is formed such that the projected configuration thereof, as seen from the axial direction, is a substantial fan shape which corresponds to the accommodating chambers 64, 66. By inserting and fitting the wireless communication tag 72 into any of the accommodating chamber 64, the accommodating chamber 66 or the accommodating portions 68A, 68B of the accommodating chamber 68, the wireless communication tag 72 is accommodated and held at the interior of the accommodating chamber 64, 66 or the accommodating portion 68A, 68B. A pair of anchor claws 74, which project toward the outer peripheral side, are formed at the wireless communication tag 72 at the outer peripheral surface of the insertion side end portion thereof. An engaging projection 76 is formed at the entrance side end surface portion of the wireless communication tag 72 so as to project toward the axial center S. On the other hand, anchor holes 78, which correspond to the anchor claws 74 of the wireless communication tag 72, are formed at the peripheral wall portion of the tubular body 44 at each of the accommodating chambers 64, 66 and the accommodating portions 68A, 68B. A notch-shaped engaging concave portion 80, which corresponds to the engaging projection 76 of the wireless communication tag 72, is formed at the rear end surface of the inner peripheral tube portion 50 at each of the accommodating chambers 64, 66 and the accommodating portions 68A, 68B.

Accordingly, when the wireless communication tag 72 is inserted in and fit into any of the accommodating chambers 64, 66 or accommodating portions 68A, 68B, the outer peripheral surface of the wireless communication tag 72 is in a state of being fit tightly against the inner peripheral surface of the tubular body 44. The pair of anchor claws 74 are inserted into the pair of anchor holes 78, and the engaging projection 76 is engaged with the engaging concave portion 80. In this way, movement of the wireless communication tag 72 along the axial direction is reliably restricted, and due to the engaging projection 76 engaging with the engaging concave portion 80, joggling along the peripheral direction also is prevented. The wireless communication tag 72 which has been inserted and fit in the accommodating chamber 64, 66 or 68 is removed from the tubular body 44 by being pulled outwardly while the pair of anchor claws 74 are elastically deformed toward the inner peripheral side by a tool exclusively used for this purpose or the like.

Figure 6:
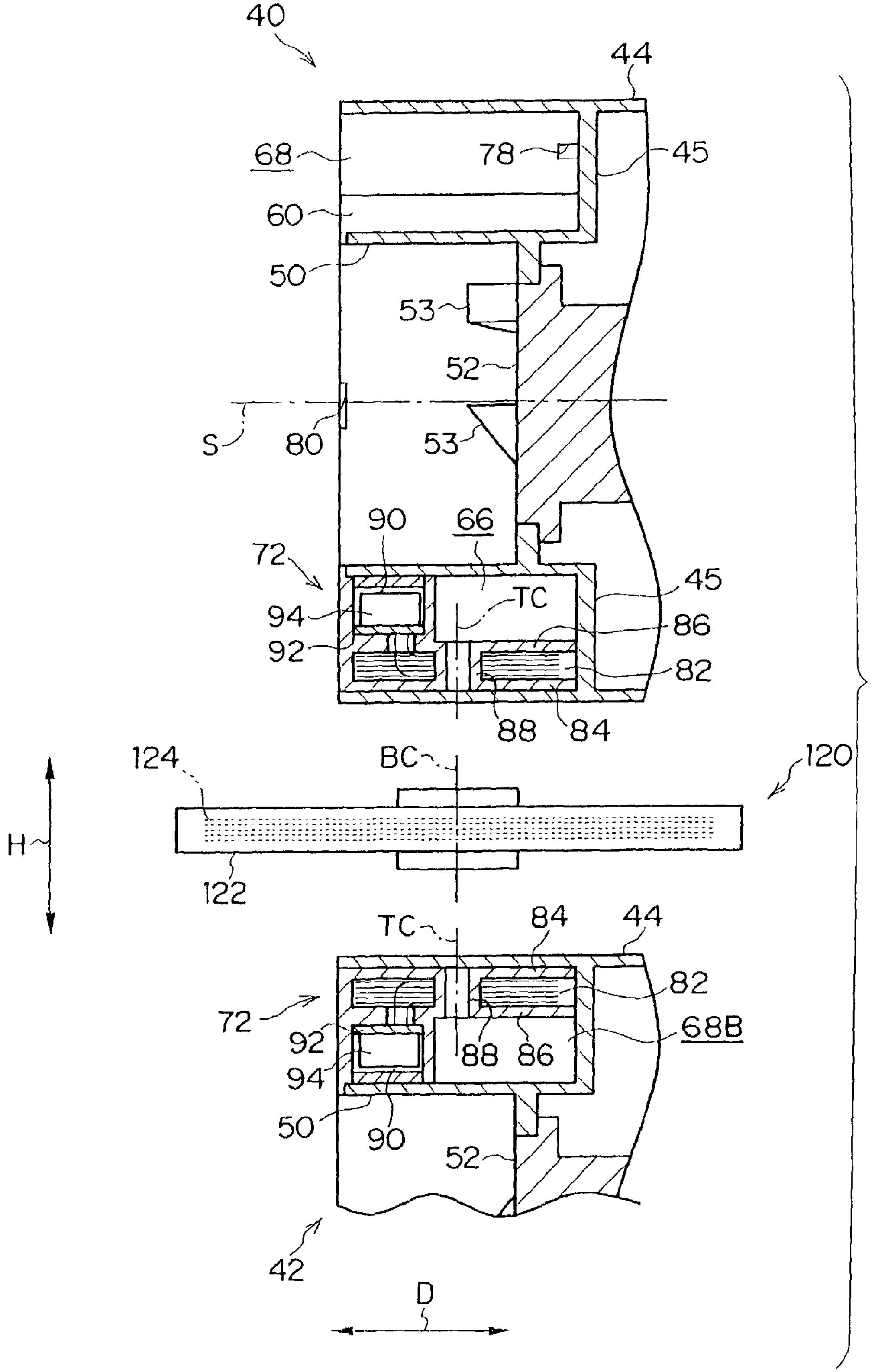
FIG. 6 is a side sectional view showing the structure of the wireless communication tags attached to the toner cartridges and the antenna unit of the wireless communication device, in the laser printer shown in FIG. 1.

As shown in FIG. 4, a tag antenna 82, which is formed by winding an electrically conductive wire material such as a copper wire or the like into the form of a coil, is provided within the wireless communication tag 72. A coil axis TC of the tag antenna 82, which is the center of the winding of the electrically conductive wire material, is provided so as to be substantially parallel to the direction of thickness of the wireless communication tag 72. The configuration of the coil surface along the direction perpendicular to the axis curves along the outer peripheral surface of the wireless communication tag 72. Specifically, as shown in FIGS. 5 and 6, an outer wall portion 84 and an inner wall portion 86, which are curved parallel to one another, are provided at the wireless communication tag 72. A core portion 88 is connected between the outer wall portion 84 and the inner wall portion 86. Due to an electrically conductive wire material being wound around the outer peripheral side of the core portion 88, the tag antenna 82, which is flat along the axial direction, is curved along the outer peripheral surface of the wireless communication tag 72.

A partitioned chamber portion 90, which is closed to the exterior, is provided at the inner peripheral side of the tag antenna 82 at the wireless communication tag 72. A circuit board 92 is accommodated in the partitioned chamber portion 90. An IC chip 94, at which the control circuits of the wireless communication tag 72 are integrated as one chip, is packaged on the circuit board 92. The IC chip 94 is electrically connected to the tag antenna 82 via the circuit board 92 or the like.

As shown in FIG. 2, at the cartridge holder 34 which is provided at the device main body, two cartridge loading portions 96, 98 are disposed at the topmost level, one cartridge loading portion 100 is disposed at the middle level, and one cartridge loading portion 102 is disposed at the bottommost level, along the heightwise direction of the device (the direction of arrow H). The toner cartridges 36, 38, 40, 42 are detachably loaded into these cartridge loading portions 96, 98, 100, 102, respectively. Here, the four toner cartridges 36, 38, 40, 42 which are loaded in the cartridge holder 34 are arranged in a backward L-shape as seen from the axial direction outer sides thereof. In this way, as compared with a case in which the four toner cartridges 36, 38, 40, 42 are arranged rectilinearly along the heightwise direction, it is possible to suppress an increase in the dimension along the heightwise direction of the device.

As shown in FIG. 2, four driving units 108 are provided at the cartridge holder 34 at the end portion at the back side of the device, so as to correspond to the respective loading positions of the four toner cartridges 36, 38, 40, 42. (Note that only the two driving units 108 at the uppermost level are illustrated in FIG. 2.) The outer configuration of each driving unit 108 is thick-plate-shaped, and the driving units 108 are supported such that the directions of thickness thereof coincide with the depthwise direction of the device. Driving connecting plates (not shown), which corresposnd to the driven connecting plates 52 (see FIG. 4) of the toner cartridges 36, 38, 40, 42, are rotatably disposed at the front surface portions of the driving units 108, which front surface portions oppose the distal end surfaces of the toner cartridges 36, 38, 40, 42. The driving connecting plates basically have shapes which are symmetrical to the driven connecting plates 52, and can mesh with the driven connecting plates 52. A driving motor (not shown) is housed within each driving unit 108. These driving motors rotate so as to rotate the driving connecting plates at times when the developing devices 21, 23, 25, 27 are operated.

As shown in FIG. 2, a supporting plate 104, which extends in a backwards L shape so as to enclose the four toner cartridges 36, 38, 40, 42, is provided at the device front side end portion of the cartridge holder 34. Four supporting brackets 106 are connected and fixed to the supporting plate 104 so as to correspond to the positions where the four toner cartridges 36, 38, 40, 42 are loaded. In the state in which the four toner cartridges 36, 38, 40, 42 are loaded at the cartridge holder 34, the toner cartridges 36, 38, 40, 42 span between the driving units 108 and the supporting brackets 106, and the distal end portions and rear end portions of the toner cartridges 36, 38, 40, 42 are supported by the driving units 108 and the supporting brackets 106. Shutter engaging portions and cover engaging portions (neither of which is illustrated), which can engage with the shutter members 56 and the sliding covers 57 of the toner cartridges 36, 38, 40, 42, are provided at the supporting brackets 106.

As shown in FIG. 2, at each of the cartridge loading portions 96, 98, 100, 102 of the cartridge holder 34, two guide members 110, 112 span between the driving unit 108 and the supporting bracket 106 so as to extend along the depthwise direction. When the toner cartridges 36, 38, 40, 42 are to be inserted into and removed from the cartridge holder 34, they are guided by the guide members 110, 112 so as to move rectilinearly along the depthwise direction.

At the laser printer 10, when the toner cartridges 36, 38, 40, 42 are to be loaded into the corresponding cartridge loading portions 96, 98, 100, 102 at the cartridge holder 34, first, the toner cartridges 36, 38, 40, 42 are inserted along the depthwise direction toward the rear of the device, and the distal ends of the toner cartridges 36, 38, 40, 42 abut the driving units 108. In this way, the distal end portions of the toner cartridges 36, 38, 40, 42 are connected to the driving units 108, and the shutter engaging portions of the supporting brackets 106 engage with the shutter members 56 of the toner cartridges 36, 38, 40, 42. Interlockingly with this operation of inserting the toner cartridges 36, 38, 40, 42 into the cartridge holder 34, the cover engaging portions of the supporting brackets 106 engage with the sliding covers 57 and slide the sliding covers 57 from their covering positions to their standby positions.

Next, by using the handle portions 48 to rotate the toner cartridges 36, 38, 40, 42 clockwise by a predetermined angle, the loading of the toner cartridges 36, 38, 40, 42 into the cartridge loading portions 96, 98, 100, 102 is completed. At this time, the driving connecting plates disposed at the driving units 108 mesh with the driven connecting plates 52 of the toner cartridges 36, 38, 40, 42. The driving motors housed within the driving units 108 are connected so as to be able to transmit torque to the screw feeders within the toner cartridges 36, 38, 40, 42, via the driving connecting plates and the driven connecting plates 52. Interlockingly with the rotation of the toner cartridges 36, 38, 40, 42 at the cartridge loading portions 96, 98, 100, 102, the shutter engaging portions of the supporting brackets 106 engage with the shutter members 56 and slide the shutter members 56 from their closed positions to their open positions. In this way, the toner supplying ports 54 are opened, and the toners filled in the toner cartridges 36, 38, 40, 42 can be discharged through the toner supplying ports 54.

As shown in FIG. 2, at the laser printer 10, toner feeding tubes 114 are disposed between the developing devices 21, 23, 25, 27 and the cartridge loading portions 96, 98, 100, 102 of the cartridge holder 34. One end portions of the toner feeding tubes 114 are connected to the supporting brackets 106. When the toner cartridges 36, 38, 40, 42 are loaded in the cartridge loading portions 96, 98, 100, 102, the one end portions of the toner feeding tubes 114 are connected to the toner supplying ports 54 of the toner cartridges 36, 38, 40, 42 via the supporting brackets 106. Screw feeders for conveying toner (not shown) are disposed within the toner feeding tubes 114. Torque from driving motors within the driving units 108 is transmitted to these screw feeders via torque transmitting shafts 116 and the like.

At the laser printer 10, when the developing devices 21, 23, 25, 27 are operated, the driving motors housed within the driving units 108 corresponding to the developing devices 21, 23, 25, 27 which are being operated are rotated. In this way, at the toner cartridges 36, 38, 40, 42, the toners are discharged at a predetermined speed from the toner supplying ports 54 by the operation of the screw feeders, and the toners are supplied through the toner feeding tubes 114 to the developing devices 21, 23, 25, 27 which are in an operating state. At this time, the amounts of toner supplied to the developing devices 21, 23, 25, 27 are controlled so as to be substantially equal to the amounts of toner which are consumed for developing.

As shown in FIG. 3, at the cartridge holder 34, plate-shaped antenna units 118, 120 are disposed at the device rear side between the cartridge loading portions 96, 98 and at the device rear side between the cartridge loading portions 100, 102, respectively. Casing portions 122, which are formed in thin-walled plate shapes of resin, are provided at the antenna units 118, 120. Main body antennas 124, which are coil-shaped and formed by winding an electrically conductive wire material such as a copper wire or the like, are disposed within the casing portions 122. Coil axes BC (see FIG. 5) of these antenna units 118, 120 are parallel to the directions of thickness of the casing portions 122. The front and reverse surfaces (coil surfaces) of the antenna units 118, 120 along the direction orthogonal to the axes are parallel to the surface directions of the casing portions 122. Here, the antenna unit 118 which is disposed at the uppermost level of the cartridge holder 34 is supported such that the surface direction thereof, which is orthogonal to the axial direction thereof, is substantially orthogonal to the thickness direction of the device (the direction of arrow W). The antenna unit 120 which is disposed between the middle level and the bottommost level is supported such that the surface direction thereof is substantially orthogonal to the heightwise direction of the device (the direction of arrow H).

As shown in FIG. 3, in the state in which the toner cartridges 36, 38, 40, 42 are loaded in the cartridge holder 34, the upper antenna unit 118 is supported so as to be inserted in the gap formed between the toner cartridges 36, 38 along the widthwise direction of the device, and the lower antenna unit 120 is supported so as to be inserted into the gap formed between the toner cartridges 40, 42 along the heightwise direction of the device.

At the toner cartridge 36 which is loaded in the cartridge loading portion 96, the wireless communication tag 72 is fit and inserted in the accommodating portion 68A within the accommodating chamber 68. At the toner cartridge 38 which is loaded in the cartridge loading portion 98, the wireless communication tag 72 is fit and inserted in the accommodating chamber 64. In this way, the coil surface of the tag antenna 82 at the toner cartridge 36 directly opposes one coil surface along the thickness direction of the main body antenna 124 and is sufficiently close to this one coil surface. The coil surface of the tag antenna 82 at the toner cartridge 38 opposes the other coil surface along the thickness direction of the main body antenna 124 and is sufficiently close to this other coil surface.

Further, at the toner cartridge 40 which is loaded in the cartridge loading portion 100, the wireless communication tag 72 is fit and inserted in the accommodating chamber 66. At the toner cartridge 42 which is loaded in the cartridge loading portion 102, the wireless communication tag 72 is fit and inserted in the accommodating portion 68B at the accommodating chamber 68. In this way, the coil surface of the tag antenna 82 at the toner cartridge 40 directly opposes the upper coil surface of the main body antenna 124 and is sufficiently close to this upper coil surface. The coil surface of the tag antenna 82 at the toner cartridge 42 directly opposes the lower coil surface of the main body antenna 124 and is sufficiently close to this lower coil surface (FIG. 5).

Here, usually, the transmission and receiving of radio waves between the tag antenna 82 and the main body antenna 124 is such that, the shorter the distance between the antennas, the better the efficiency of the transmission and receipt of radio waves. Further, the more the tag antenna 82 and the main body antenna 124 approach a parallel positional relationship, the better the efficiency of the transmission and receipt of radio waves. At the laser printer 10, the tag antennas 82 attached to the toner cartridges 38, 40, 42 are supported parallel to the main body antennas 124. The transmission and receipt of radio waves with the main body antennas 124 can be carried out at substantially the highest efficiency, under the condition that the distance between the antennas is constant. Further, although the tag antenna 82 which is attached to the toner cartridge 36 is supported so as to be inclined at a given angle (of about 20°) with respect to the main body antenna 124, the distance between this tag antenna 82 and the main body antenna 124 is sufficiently small. Therefore, the transmission and receipt of radio waves can be carried out with sufficiently high efficiency. In other words, if the output of radio waves used between the wireless communication tags 72 and a wireless communication device 130 at the main body (see FIG. 11) is made to be sufficiently small, a state of good communication can be maintained between the main body antenna 124 and the wireless communication tags 72 which are set to have a communicating relationship with this main body antenna 124, and interference between this main body antenna 124 and the wireless communication tags 72 which are not set to have a communicating relationship with this main body antenna 124 can be reliably prevented.

Further, when the toner cartridges 36, 38, 40, 42 are not loaded perfectly in the cartridge loading portions 96, 98, 100, 102, the distance between the tag antenna 82 and the main body antenna 124 is longer than the designed set value. Thus, communication between the wireless communication device 130 and the wireless communication tags 72 of the toner cartridges 36, 38, 40, 42 which are not perfectly loaded cannot be carried out properly. Accordingly, if the wireless communication device 130 cannot carry out communication properly with the wireless communication tag 72 of any of the toner cartridges 36, 38, 40, 42, an alarm signal corresponding to this situation may be outputted to a central controlling section or the like, and the central controlling section or the like may carry out control for informing the user that the toner cartridge is not loaded perfectly.

As shown in FIG. 8, when the tubular bodies 44 of the toner cartridges 36, 38, 40, 42 are being manufactured, four identification keys 44A, 44B, 44C, 44D are molded integrally on the outer peripheral surfaces thereof. These identification keys 44A, 44B, 44C, 44D are formed in the shape of projections which are long and thin along the axial direction, and are arranged at a uniform pitch along the peripheral direction at the lower portion side of the tubular body 44. Here, these four identification keys 44A, 44B, 44C, 44D are provided so as to correspond to the four types of toners (M toner, Y toner, K toner, and C toner) housed in the toner cartridges 36, 38, 40, 42. When the toner cartridge 36, 38, 40, 42 which accommodates a given type (color) of toner is being assembled, three of the identification keys 44A, 44B, 44C, 44D, which correspond to the toners other than the toner which is to be housed, are removed from the tubular body 44. Only one of the identification keys 44A, 44B, 44C, 44D, which corresponds to the toner which is to be housed, remains at the tubular body 44.

The identification keys 44A, 44B, 44C, 44D are removed from the tubular body 44 by, for example, a shearing force being applied thereto while the base (root) portion thereof is heated. Or, instead of the identification keys 44A, 44B, 44C,

44D being molded integrally with the tubular body 44, four or more key attaching portions for attaching at least the identification keys may be formed at the tubular body 44. In this case, a plate-shaped identification key may be fixed to one of the key attaching portions by insertion, adhesion, or the like, such that an identification key is attached to the tubular body 44 at the position corresponding to the toner.

As shown in FIG. 5, a slit-shaped engaging groove 113 is formed at each of the cartridge loading portions 96, 98, 100, 102 of the cartridge holder 34 in the lower side guide member 112 at a region corresponding to one of the four identification keys 44A, 44B, 44C, 44D. (In FIG. 5, only the guide members 112 of the cartridge loading portions 100, 102 are illustrated.) The engaging groove 113 extends from the supporting plate 104 side one end of the guide member 112 to a vicinity of the center of the guide member 112 along the depthwise direction of the device. In this way, when the toner cartridges 36, 38, 40, 42 are loaded in the respective cartridge loading portions 96, 98, 100, 102, the identification keys 44A, 44B, 44C, 44D can move toward the rear of the device along the engaging grooves 113 only in cases in which the correct toner cartridges 36, 38, 40, 42 housing the predetermined types of toners are loaded in the cartridge loading portions 96, 98, 100, 102. In cases in which an attempt is made to load incorrect toner cartridges 36, 38, 40, 42, which are housing toners other than the predetermined types, into the cartridge loading portions 96, 98, 100, 102, the identification keys 44A, 44B, 44C, 44D collide with the end surfaces of the guide members 112, and movement toward the rear of the device is impeded.

Accordingly, insertion of the toner cartridges 36, 38, 40, 42 into the cartridge loading portions 96, 98, 100, 102 is impeded only when the user erroneously attempts to load incorrect toner cartridges 36, 38, 40, 42 into the cartridge loading portions 96, 98, 100, 102. Thus, mistakes in loading the toner cartridges 36, 38, 40, 42 into the cartridge loading portions 96, 98, 100, 102 can reliably be prevented.

In place of providing the identification keys 44A, 44B, 44C, 44D at the toner cartridges 36, 38, 40, 42, it is possible to form cartridge identification grooves, which extend along the axial direction, in respectively different regions for each type of toner, and to provide, at the guide members 112 of the cartridge loading portions 96, 98, 100, 102, projecting portions which respectively correspond to the cartridge identification grooves.

Moreover, a cartridge identification portion may be provided at each of the toner cartridges 36, 38, 40, 42, and at each of the cartridge loading portions 96, 98, 100, 102, a mechanical sensor may be provided which detects the configuration, position or the like of the cartridge identification portion and identifies the type of the toner cartridge 36, 38, 40, 42, or, an information reading sensor may be provided which optically, magnetically, or mechanically reads information corresponding to the cartridge type which is recorded at the cartridge identification portion and identifies the type of the loaded toner cartridge 36, 38, 40, 42. In this way, in a case in which the correctness/incorrectness of the loaded toner cartridge 36, 38, 40, 42 is judged on the basis of a signal from the mechanical sensor or the information reading sensor, and it is judged that an incorrect toner cartridge 36, 38, 40, 42 has been loaded, the central control section or the like of the laser printer 10 can execute control such as, for example, interlocking the operations of the device, outputting an alarm signal to the user, or the like.

(Structure and Operation of Wireless Communication System)

Next, description will be given of the structure and the operation of the laser printer which is structured as described above and which is equipped with the wireless communication system relating to the present embodiment.

Figure 11:
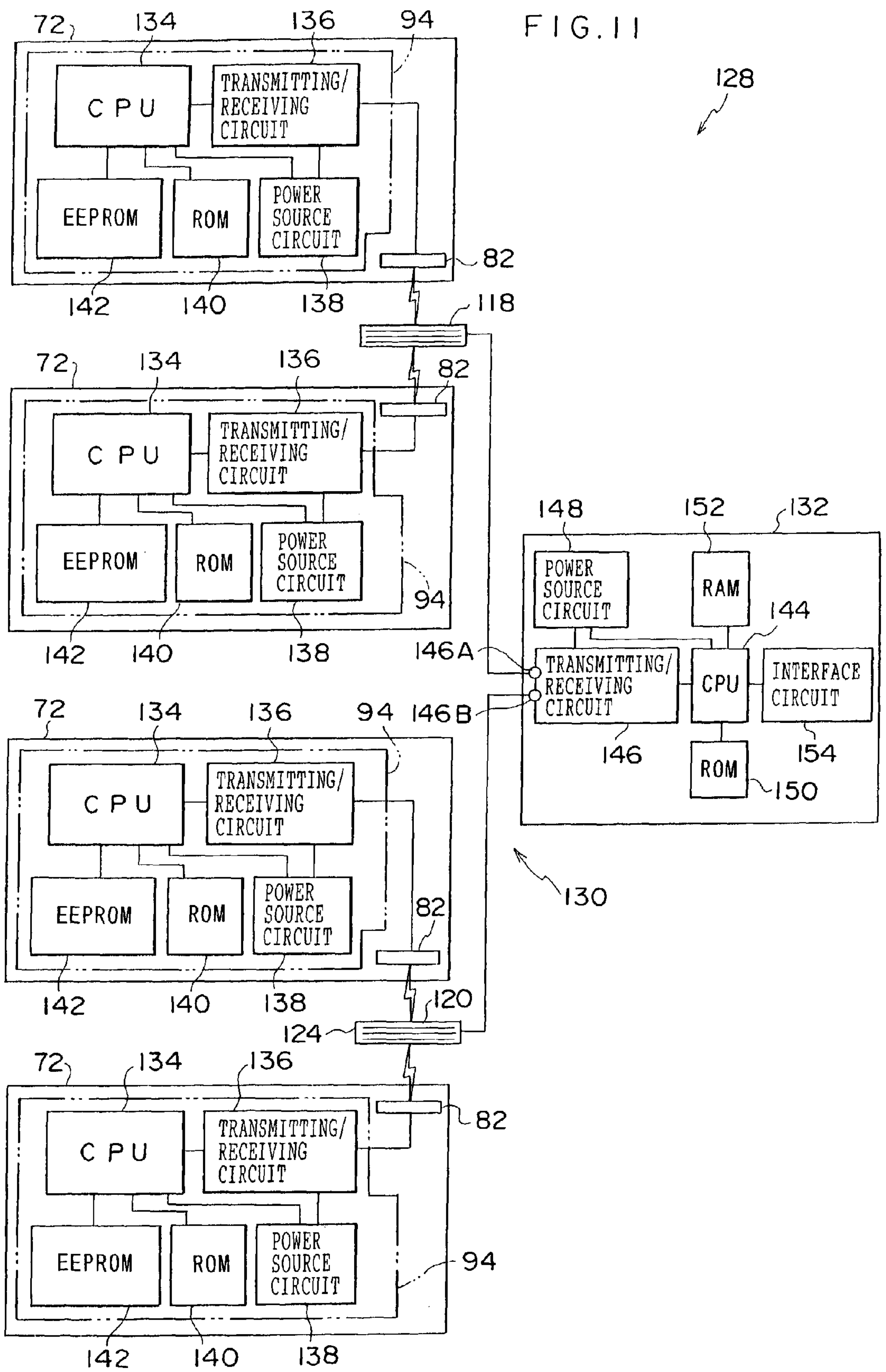
FIG. 11 is a block diagram showing the structure of the wireless communication system in the laser printer relating to the embodiment of the present invention.

The structure of the wireless communication system relating to the present embodiment is illustrated as a block diagram in FIG. 11. A wireless communication system 128 is formed by the wireless communication tags 72 which are attached to the four toner cartridges 36, 38, 40, 42, and the wireless communication device 130 which is provided at the device main body. The wireless communication device 130 is equipped with the two antenna units 118, 120 which are disposed at the cartridge holder 34, and a main body portion 132 to which these antenna units 118, 120 are connected.

As described above, each of the wireless communication tags 72 which are attached to the toner cartridges 36, 38, 40, 42 has the coil-shaped tag antenna 82 and the IC chip 94 which is packaged on the circuit board 92. As shown in FIG. 11, the IC chip 94 is structured as a single element in which a CPU 134, a transmitting/receiving circuit 136, a power source circuit 138, a ROM 140 and an EEPROM 142 are integrated. The CPU 134 controls the entire wireless communication tag 72 in accordance with a control program stored in the ROM 140. In addition to the control program, a multi ID, a password, and a system ID are stored in the ROM 140 as unique information corresponding to the type of the toner cartridge 36, 38, 40, 42. Here, the multi ID is basically data applied in accordance with the type of the toner cartridge 36, 38, 40, 42. The password and the system ID are data for confirming that the wireless communication tag 72 is a wireless communication tag 72 which is allowed to exchange information with the wireless communication device 130.

The EEPROM 142 is a non-volatile information storage element which does not require electric power in order to maintain stored information. Arbitrary information can be written into the EEPROM 142 by the CPU 134, and arbitrary information can be read from the written information. Specifically, information such as the following, for example, is written into the EEPROM 142 by the CPU 134, and as needed, the contents of the written information are updated:

(A) process information such as the amount of exposure, the amount of charge, the developing bias and the like of the photosensitive drums 20, 22, 24, 26;

(B) for the toner cartridges 36, 38, 40, 42: their lot number, manufacturing date, type, storage period, identification number, number of times recycling has been carried out, upper limit value of number of times recycling can be carried out, and replacement periods of the structural parts of the cartridge;

(C) for the toners: their lot number, manufacturing date, filled amount, type, storage period, number of times recycling has been carried out, and upper limit value of number of times recycling can be carried out.

At the time of transmitting information, the transmitting/receiving circuit 136 of the wireless communication tag 72 converts the parallel information signal which has been sent in from the CPU 134 into a serial information signal, and thereafter, outputs to the tag antenna 82 an electric signal which has been modulated by this information signal. In this way, a radio wave signal corresponding to the information signal from the CPU 134 is outputted from the tag antenna 82. At the time of receiving information, the transmitting/receiving circuit 136 demodulates the electric signal, which was obtained from the radio wave signal received from the tag antenna 82, into a serial information signal, and thereafter, converts this information signal into a parallel information signal and outputs it to the CPU 134.

When the power source circuit 138 of the wireless communication tag 72 is engaging in transmission and receipt with the wireless communication device 130, the power source circuit 138 separates, from the information signal, alternating current of a predetermined frequency generated by the electromagnetic induction at the tag antenna 82. After converting this alternating current into direct current, the power source circuit 138 supplies the direct current to the CPU 134 and the transmitting/receiving circuit 136. In this way, the electric power needed at the time of engaging in transmission and receipt with the wireless communication device 130 is supplied to the CPU 134 and the transmitting/receiving circuit 136, and a power source such as a battery or the like is not needed at the wireless communication tag 72.

As shown in FIG. 11, a CPU 144, a transmitting/receiving circuit 146, a power source circuit 148, a ROM 150, a RAM 152 and an interface circuit 154 are provided at the main body portion 132 of the wireless communication device 130. Here, the transmitting/receiving circuit 146 has two input/output terminals 146A, 146B for the antennas. The main body antenna 124 of the antenna unit 118 is connected to the one input/output terminal 146A, and the main body antenna 124 of the antenna unit 120 is connected to the other input/output terminal 146B. When the transmitting/receiving circuit 146 is carrying out information transmission and receipt with the wireless communication tag 72, only one of the input/output terminals 146A, 146B is on and the other is off, in accordance with the source of the input of the information or the destination of the output of the information.

The CPU 144 controls the entire wireless communication device 130 in accordance with the control program stored in the ROM 150. Further, in addition to the control program, the ROM 150 stores multi IDs, passwords, and system IDs for all of the toner cartridges 36, 38, 40, 42. By comparing the multi ID and the password inputted from the wireless communication tag 72 and the multi IDs and the passwords stored in the ROM 150, the CPU 144 identifies the type of the toner cartridge 36, 38, 40, 42 to which is attached the wireless communication tag 72 which is currently transmitting radio waves. The CPU 144 also confirms that the wireless communication tag 72 is a wireless communication tag 72 which is permitted to exchange information with the wireless communication device 130.

The CPU 144 temporarily stores, in the RAM 152, the process information, such as the exposure amount, charge amount, developing bias, and the like with respect to the photosensitive drums 20, 22, 24, 26 for the respective toner cartridges 36, 38, 40, 42, which information has been transmitted in from the central control section (not shown) of the laser printer 10 through the interface circuit 154, and also temporarily stores writing information, such as the toner consumption amount and the like, which are computed on the basis of the process information. Thereafter, at a predetermined timing, the CPU 144 reads transmission information from the RAM 152, and transmits the information to the wireless communication tag 72. In this way, the CPU 134 of the wireless communication tag 72 writes in the EEPROM 142 the writing information received from the wireless communication device 130, and records in the EEPROM 142 the remaining amount of toner which is obtained by subtracting the consumed amount of toner from the filled amount of toner.

When the transmitting/receiving circuit 146 of the main body portion 132 transmits information, the transmitting/receiving circuit 146 converts the parallel information signal which has been sent in from the CPU 144 into a serial information signal, and thereafter, outputs an electric signal, which has been modulated by this information signal, to either of the two main body antennas 124. In this way, a radio wave signal corresponding to the information signal from the CPU 144 is outputted from the main body antenna 124. When the transmitting/receiving circuit 146 receives information, the transmitting/receiving circuit 146 demodulates an electric signal, which is obtained by radio waves received from the main body antenna 124, into a serial information signal. Thereafter, the transmitting/receiving circuit 146 converts this information signal into a parallel information signal, and outputs the parallel information signal to the CPU 144.

During communication with the wireless communication tag 72, the power source circuit 148 in the main body portion 132 supplies alternating current of a predetermined frequency to the main body antenna 124. In this way, electromagnetic induction arises at the tag antenna 82 which is facing that main body antenna 124, and as described above, the induced current (electric power) is supplied to the wireless communication tag 72. Here, at the time of transmitting, the same band as that of the frequency of the electric signal used in information forwarding by the transmitting/receiving circuits 136, 146 is selected for the frequency of the alternating current supplied to the main body antenna 124 by the power source circuit 148. At the time of receiving, a different band than that of the frequency of the electric signal used in information forwarding by the transmitting/receiving circuits 136, 146 (e.g., a high frequency band) is selected for the frequency of the alternating current supplied to the main body antenna 124 by the power source circuit 148.

At the point in time when the CPU 144 of the main body portion 132 judges that all of the toners have been discharged from the toner cartridges 36, 38, 40, 42, the CPU 144 transmits a count-up signal to the wireless communication tags 72 attached to the toner cartridges 36, 38, 40, 42. The CPUs 134 of the wireless communication tags 72 which have received the count-up signal add a "1" to the number of times the toner cartridges 36, 38, 40, 42 have been recycled and the number of times the toners have been recycled, which numbers of times are written in the EEPROM 142.

Figure 15:
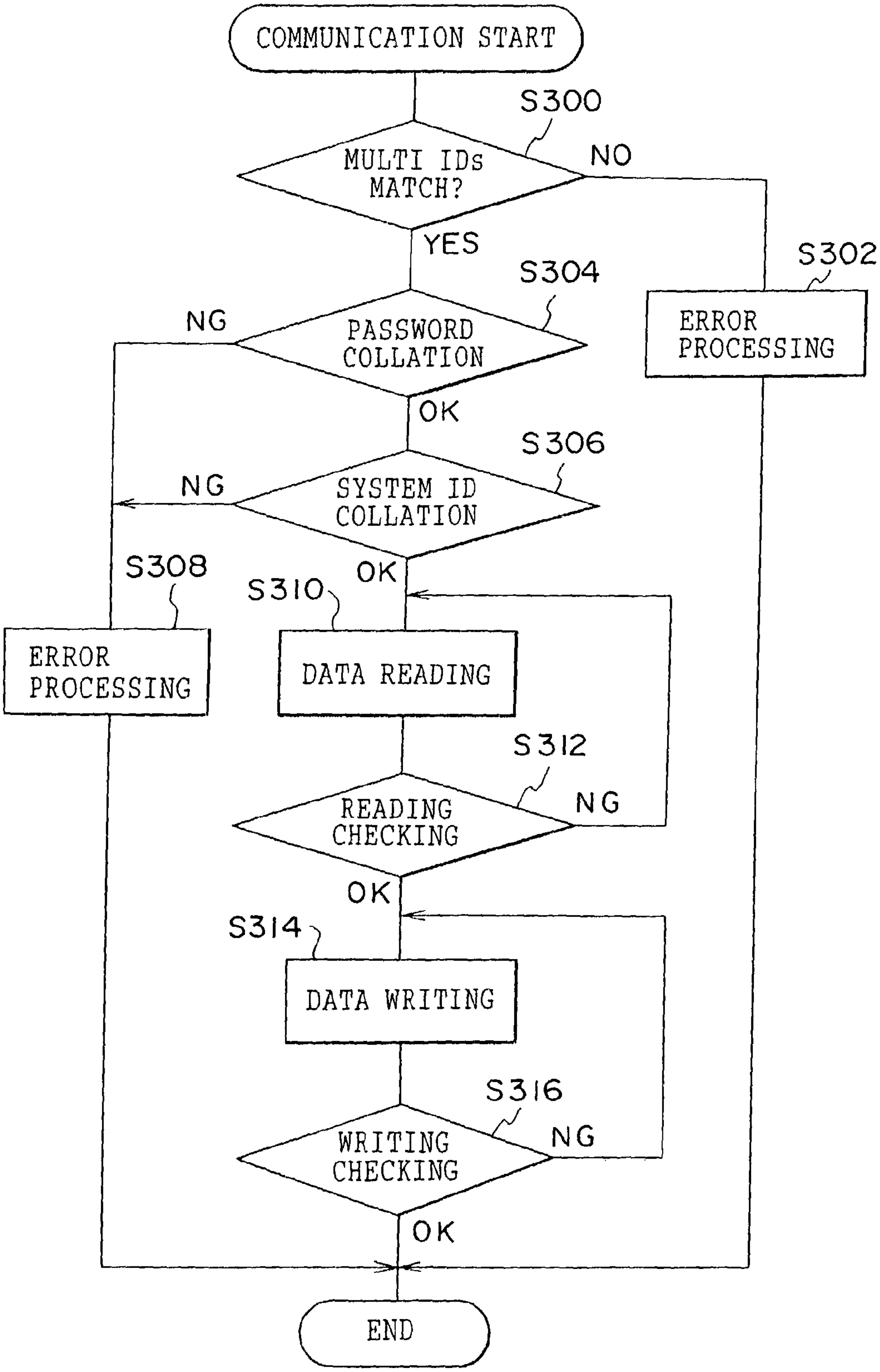
FIG. 15 is a flowchart showing operations at the time of communication starting processing by the wireless communication system relating to the embodiment of the present invention.

FIG. 15 illustrates the series of operations of the communication starting processing at the wireless communication system 128 relating to the present embodiment. At the laser printer 10, the communication starting processing of the wireless communication system 128, which processing is shown in FIG. 15, is carried out by the CPU 144 of the wireless communication device 130 when the power of the laser printer 10 is turned on, when the cartridges 36, 38, 40, 42 are replaced, when resetting processing is carried out after occurrence of an abnormality such as a jam, or the like.

At the wireless communication system 128, the destinations of communication which carry out communication with the wireless communication device 130 are, correctly speaking, the wireless communication tags 72 attached to the toner cartridges 36, 38, 40, 42. However, in the following description relating the flowchart of FIG. 15, when there is no need to precisely distinguish the destination of communication, the destination of communication of the wireless communication device 130 will simply be termed "the toner cartridge 36, the toner cartridge 38, the toner cartridge 40 or the toner cartridge 42" in order to simplify explanation.

In the communication starting processing, in step 300, it is judged whether the multi ID (M) of the wireless communication device 130 and the multi ID (M) of the toner cartridge 36 match. In step 300, when the multi ID (M) of the wireless communication device 130 and the multi ID (M) of the toner cartridge 36 match, it is judged that the appropriate toner cartridge 36 has been loaded into the cartridge loading portion 96 of the cartridge holder 34. The routine proceeds to step 304 where the wireless communication device 130 starts to communicate with the toner cartridge 36. If the multi ID (M)

of the wireless communication device 130 and the multi ID (M) of the toner cartridge 36 do not match, the routine moves to step 302. In step 302, it is judged that either the toner cartridge is not loaded normally in the cartridge loading portion 96 of the cartridge holder 34, or that the toner cartridge loaded in the cartridge loading portion 96 is an incorrect toner cartridge, and a predetermined error processing is carried out.

In steps 304 through 306, password collation and system ID collation are carried out in order between the wireless communication device 130 and the toner cartridge 36. At this time, if either of the password and the system ID of the toner cartridge 36 do not match those which have been registered, it is judged that the toner cartridge loaded in the cartridge loading portion 96 is an improper toner cartridge, and the routine moves on to step 308 where a predetermined error processing is executed. Further, if it is judged that both the password and the system ID of the toner cartridge 36 are those which have been registered, the routine moves on to step 310. In step 310, the CPU 144 of the wireless communication device 130 controls the wireless communication tag 72 of the toner cartridge 36, and reads, from the EEPROM 142, process information such as the exposure amount, the charge amount, the developing bias, and the like of the photosensitive drums 20, 22, 24, 26, and the toner information such as the filled amount, the type, the storage period, and the like of the toner.

In step 312, the CPU 144 of the wireless communication device 130 carries out reading checking with the CPU 134 of the toner cartridge 36, so as to judge whether or not the information read from the EEPROM 142 and the information written in the EEPROM 142 match. If the information match, the routine moves on to step 314. If the information do not match, the routine returns to step 310, and the processing of reading information from the EEPROM 142 is repeated until the information read from the EEPROM 142 and the information written in the EEPROM 142 match. In FIG. 15, the abbreviation "NG" stands for "no good", the opposite of "OK".

In step 314, the CPU 144 of the wireless communication device 130 transmits, to the wireless communication tag 72 at the toner cartridge 36, initial information such as the identification number specific to the laser printer 10, the identification number specific to the user, the starting time of use of the toner cartridge 36, and the like, and writes this initial information in the EEPROM 142 of the wireless communication tag 72. In step 316, the CPU 144 of the wireless communication device 130 carries out writing checking with the CPU 134 of the toner cartridge 36, so as to judge whether or not the transmitted initial information has been written without errors in the EEPROM 142. If the information match, the communication starting processing with the toner cartridge 36 is completed. If the information do not match, the routine returns to step 314, and the processing of writing information in the EEPROM 142 is repeated until the initial information transmitted to the wireless communication tag 72 matches the information written in the EEPROM 142.

In the wireless communication system 128, when the communication starting processing for the toner cartridge 36 which houses the M toner is completed, basically the same processings as the series of communication starting processings shown in FIG. 15 are carried out in order as well with the toner cartridges 38, 40, 42 which house the other toners of Y, K and C. After the communication starting processing between the wireless communication device 130 and all of the toner cartridges 36, 38, 40, 42 has been completed, the central control section of the laser printer 10 cancels the interlocking such that the image forming operation can be started.

Each time image formation is carried out one time, or each time image formation is carried out a predetermined number of times, the central control section outputs, through the interface circuit 154 at the wireless communication device 130 and to the CPU 144, the process information corresponding to the toner cartridges 36, 38, 40, 42 and the information relating to the amounts of consumed toner and the like. The CPU 144 transmits the information from the central control section to the wireless communication tags 72 of the corresponding toner cartridges 36, 38, 40, 42, and writes the information from the central control section in the EEPROMs 142 of the wireless communication tags 72.

Operation of the Embodiment

Next, operation of the laser printer having the wireless communication system, which relates to the present embodiment and is structured as described above, will be described.

In the laser printer 10 having the wireless communication system 128 relating to the present embodiment, the accommodating chambers 64, 66 and the accommodating portions 68A, 68B, to which the wireless communication tag 72 can be attached, are provided at a plurality of regions of the toner cartridges 36, 38, 40, 42, which regions correspond to the respective cartridge loading portions 96, 98, 100, 102. The wireless communication tag 72 is selectively attached to one of the accommodating chambers 64, 66 and the accommodating portions 68A, 68B which corresponds to the cartridge loading portion 96, 98, 100, 102 in which the toner cartridge 36, 38, 40, 42 is loaded. In this way, in the state in which the toner cartridges 36, 38, 40, 42 which house the different toners are loaded in the respective cartridge loading portions 96, 98, 100, 102, the positions of the respective wireless communication tags 72 attached to the toner cartridges 36, 38, 40, 42 can be adjusted such that the wireless communication tags 72 are substantially parallel to and sufficiently close to the main body antennas 124 of the antenna units 118, 120. Thus, the communication by radio waves between the wireless communication tags 72 attached to the toner cartridges 36, 38, 40, 42 and the wireless communication device 130 provided at the device main body, and the supply of electric power to the IC chips 94, can be carried out stably via the tag antennas 82 and the main body antennas 124.

In accordance with the laser printer 10 having the wireless communication system 128, a common structure and configuration can be used for the toner cartridges 36, 38, 40, 42 which are loaded in the cartridge loading portions 96, 98, 100, 102. Thus, the cost of manufacturing the toner cartridges 36, 38, 40, 42 can be reduced, and the work by the manufacturer or the like for recycling the toner cartridges 36, 38, 40, 42 after they have been used is facilitated.

Further, in most cases, the used toner cartridges 36, 38, 40, 42 which have been removed from the laser printer 10 are recovered and recycled by the manufacturer or the like. At this time, there are cases in which, after the wireless communication tags 72 have been removed from the toner cartridges 36, 38, 40, 42 and the data and the like recorded on the wireless communication tags 72 have been rewritten, the work of attaching the wireless communication tags 72 to toner cartridges which have not yet been used or which have been recycled is carried out. In such cases as well, in the wireless communication system 128 of the present embodiment, the wireless communication tags 72 can easily be removed from the toner cartridges 36, 38, 40, 42 merely by elastically deforming vicinities of the anchor claws 74 of the wireless communication tags 72 toward the inner peripheral side by using a tool exclusively used therefor or the like. Thus, the work for recycling the wireless communication tag 72 units can also be carried out easily.

Cases can be conceived of in which the used toner cartridges 36, 38, 40, 42 are recovered by irregular dealers which are not legitimate dealers such as the manufacturer or the like, and these irregular dealers will attempt to carry out the work of recycling the toner cartridges 36, 38, 40, 42. When the toner cartridges 36, 38, 40, 42 which have been recycled by irregular dealers are loaded in the laser printer 10, there is the concern that problems may arise such as the device will malfunction, the image quality will deteriorate, or the like. In order to prevent such problems, for example, it is effective to prevent the wireless communication tags 72 from being removed from the toner cartridges 36, 38, 40, 42 by irregular dealers.

Here, a method is thought of in which it is possible to remove without damage the wireless communication tags 72, which are attached to the accommodating chambers 44, 46 and the accommodating portions 48A, 48B of the toner cartridges 36, 38, 40, 42, only in cases in which the removal operation is carried out in accordance with a predetermined process. As a concrete method of realizing such a method, for example, it has been thought to mold the outer covering portion of the wireless communication tag 72 from a resin material which has sufficient elastic deformation only when heated to a predetermined temperature. When the wireless communication tag 72 is to be removed, if the vicinities of the anchor claws 74 are not elastically deformed toward the inner peripheral side while being heated to a predetermined temperature, the wireless communication tag 72 is destroyed. As another method, it has been thought to provide a locking mechanism, such as a dial locking mechanism, an electromagnetic-type locking mechanism, or the like, at the wireless communication tag 72. If a predetermined lock releasing operation is not carried out on the wireless communication tag 72 from the exterior or predetermined lock releasing data is not inputted to the wireless communication tag 72 from the exterior, the locked state by the locking mechanism is not cancelled, and the wireless communication tag 72 cannot be removed without being damaged.

Modified Examples of the Present Embodiment

Next, first and second modified examples of the toner cartridge in the wireless communication system relating to the embodiment of the present invention will be described. Note that the portions of the toner cartridges relating to these modified examples, which are other than the wireless communication tags 72 and the attaching portions thereof, have the same structures as in the toner cartridges 36, 38, 40, 42 (see FIG. 4) which were previously described. Thus, members of the toner cartridges relating to the modified examples, which members have structures and operations which are the same as in the toner cartridges 36, 38, 40, 42, are denoted by the same reference numerals, and description thereof is omitted.

Figure 12:
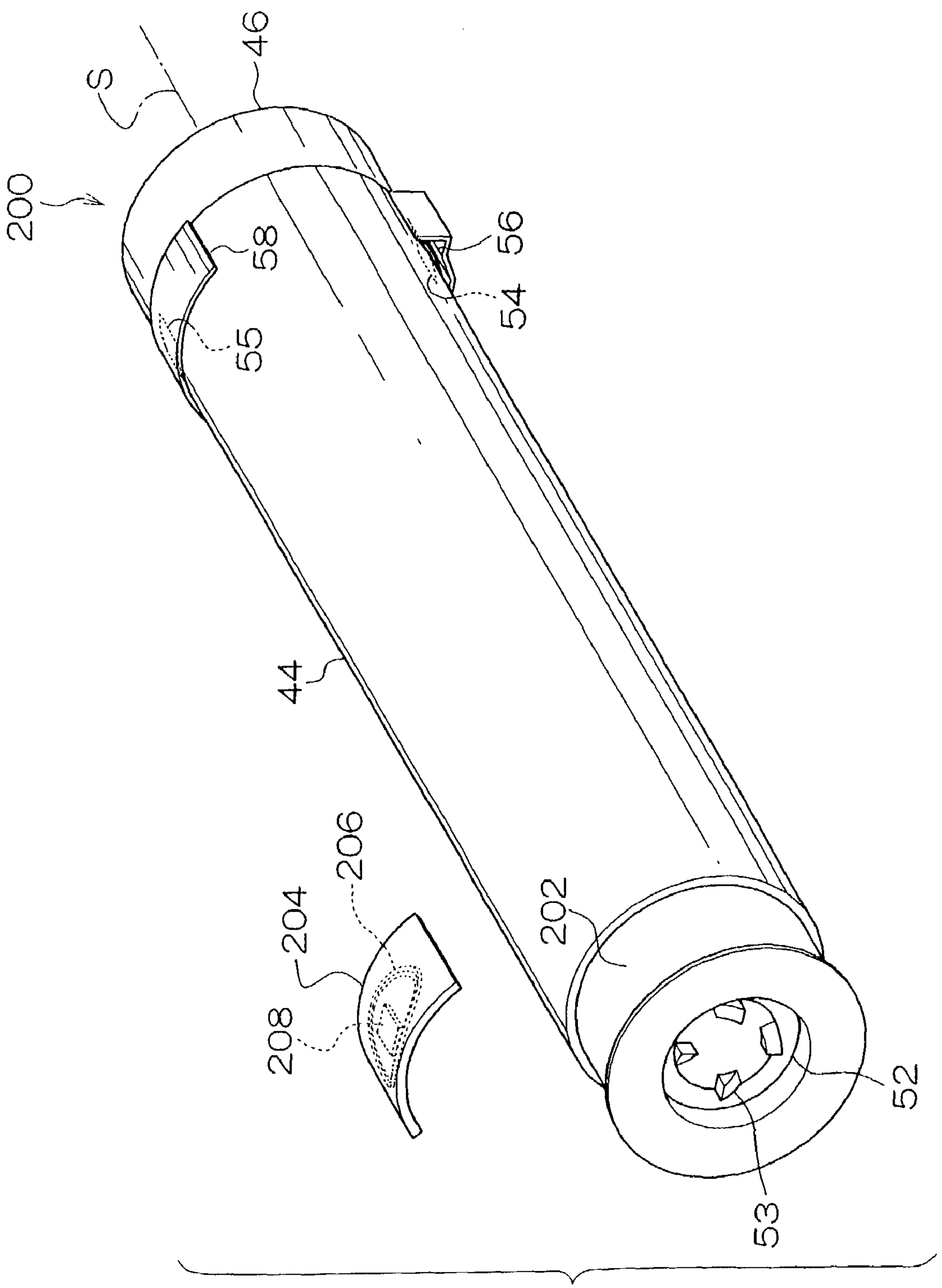
FIG. 12 is a perspective view showing a first modified example of a toner cartridge in the wireless communication system relating to the embodiment of the present invention.

FIG. 12 illustrates a first modified example of the toner cartridge of the wireless communication system relating to the embodiment of the present invention. A toner cartridge 200 is provided with a tag affixing portion 202 at the outer peripheral surface of the tubular body 44. A wireless communication tag 204, which is formed in a thin-walled plate shape, can be affixed to the tag affixing portion 202. The tag affixing portion 202 is provided at the end portion (the distal end portion) of the tubular body 44 at the side where the driven connecting plate 52 is provided. The tag affixing portion 202 is groove-shaped and has a diameter which is smaller, by a predetermined length, than the other portions of the outer peripheral surface of the tubular body 44. The configuration of the wireless communication tag 204 along the surface direction is substantially rectangular. The wireless communication tag 204 is affixed to the tag affixing portion 202 via a fixing layer formed by an adhesive, a pressure-sensitive adhesive, two-sided tape, or the like, such that the longitudinal direction of the wireless communication tag 204 coincides with the peripheral direction of the tubular body 44.

The width of the tag affixing portion 202 along the axial direction is slightly larger than the width of the wireless communication tag 204 along the shorter side direction thereof. The thickness of the tag affixing portion 202 along the radial direction is substantially the same as the thickness of the wireless communication tag 204. The wireless communication tag 204 is structured by, for example, laminating two sheet materials formed of resin or the like. A tag antenna 206, which is formed of a thin metal film patterned in a coil shape, is provided between these sheet materials. A thin-film-like IC chip 208 is disposed at the central portion of the tag antenna 206. The internal structure of the IC chip 208 is basically the same as that of the IC chip 94 which was described above with reference to FIG. 11. Thus, description of the internal structure of the IC chip 208 will be omitted. The wireless communication tag 204 either is elastic so as to be able to curve along the longitudinal direction, or is curved in advance along the longitudinal direction so as to have a radius of curvature which is substantially the same as that of the bottom surface portion of the tag affixing portion 202.

When the wireless communication tag 204 is to be affixed to the tag affixing portion 202 of the toner cartridge 200, the fixing layer is provided in advance at the inner peripheral surface of the wireless communication tag 204. The wireless communication tag 204 is inserted into the tag affixing portion 202. The entire inner peripheral surface of the wireless communication tag 204 is made to fit tightly against the bottom surface portion of the tag affixing portion 202 via the fixing layer. The wireless communication tag 204 is positioned precisely in the axial direction at a predetermined position by the tag affixing portion 202, and the position of the wireless communication tag 204 can be adjusted to an arbitrary position in the peripheral direction around the axial center S.

When the toner cartridge 200 illustrated in FIG. 12 is applied to the wireless communication system 128 relating to the present embodiment, the wireless communication tags 204 are selectively affixed to regions of the tag affixing portions 202 of the toner cartridges 200, which regions correspond to the cartridge loading portions 96, 98, 100, 102. In this way, in the state in which the four toner cartridges 200 housing the respectively different toners are loaded in the cartridge loading portions 96, 98, 100, 102, the positions of the wireless communication tags 204 affixed to the toner cartridges 200 can be adjusted such that the wireless communication tags 204 are substantially parallel to and sufficiently close to the main body antennas 124 of the antenna units 118, 120. Thus, the communication by radio waves between the wireless communication tags 204 attached to the four toner cartridges 200 and the wireless communication device 130 provided at the device main body, and the supply of electric power to the IC chips 208, can be carried out stably via the tag antennas 206 and the main body antennas 124.

Further, a common structure and configuration can be used for the respective toner cartridges 200 which are loaded in the cartridge loading portions 96, 98, 100, 102. Thus, the cost of manufacturing the toner cartridges 200 can be reduced, and the work by the manufacturer or the like for recycling the toner cartridges 200 after they have been used is facilitated.

At the toner cartridge 200, because the wireless communication tag 204 which is affixed to the tag affixing portion 202 is exposed at the surface portion of the toner cartridge 200, the outer covering portion of the tubular body 44 of the like of the toner cartridge 200 does not exist between the wireless communication tag 204 and the main body antenna 124. As a result, even in cases in which the outer covering portion of the toner cartridge 200 is formed of a material which blocks radio waves such as metal or the like, radio wave communication between the wireless communication tag 204 and the wireless communication device 130 can be carried out well.

In the toner cartridge 200 shown in FIG. 12, the tag affixing portions 202 are provided so as to extend in the peripheral direction, in accordance with the arrangement of the cartridge loading portions 96, 98, 100, 102 in the laser printer 10. However, when the toner cartridge 200 is applied to image forming devices in which the arrangement of the cartridge loading portions is different than in the present embodiment, the tag attaching portions to which the wireless communication tags 204 are affixed can be provided at arbitrary regions of the toner cartridges 200 in accordance with the arrangement of the cartridge loading portions. Further, the wireless communication tags 204 can be directly affixed to arbitrary regions of the outer peripheral surfaces of the tubular bodies 44, without providing the tag attaching portions.

Figure 13:
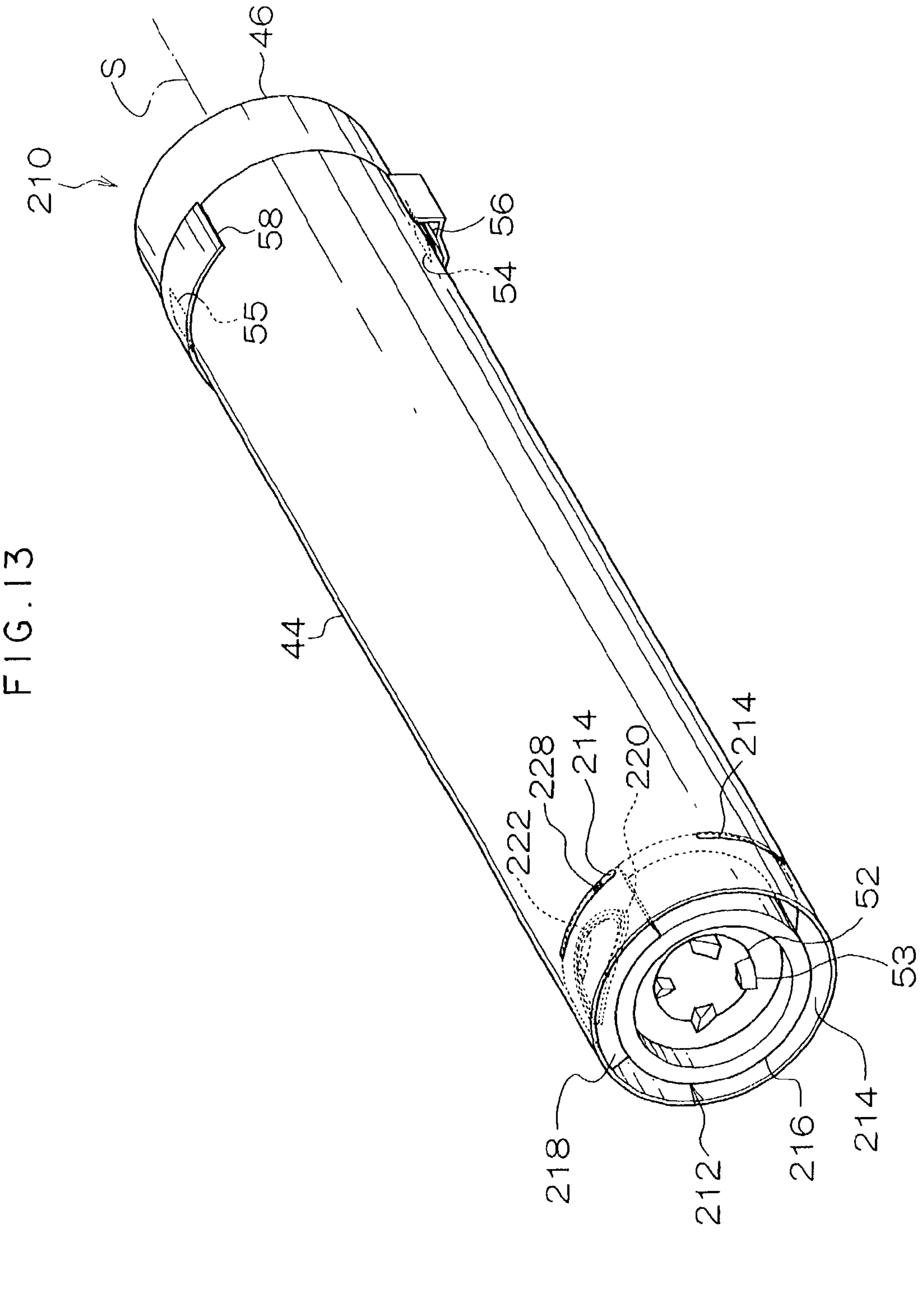
FIG. 13 is a perspective view showing a second modified example of a toner cartridge in the wireless communication system relating to the embodiment of the present invention.
Figure 14:
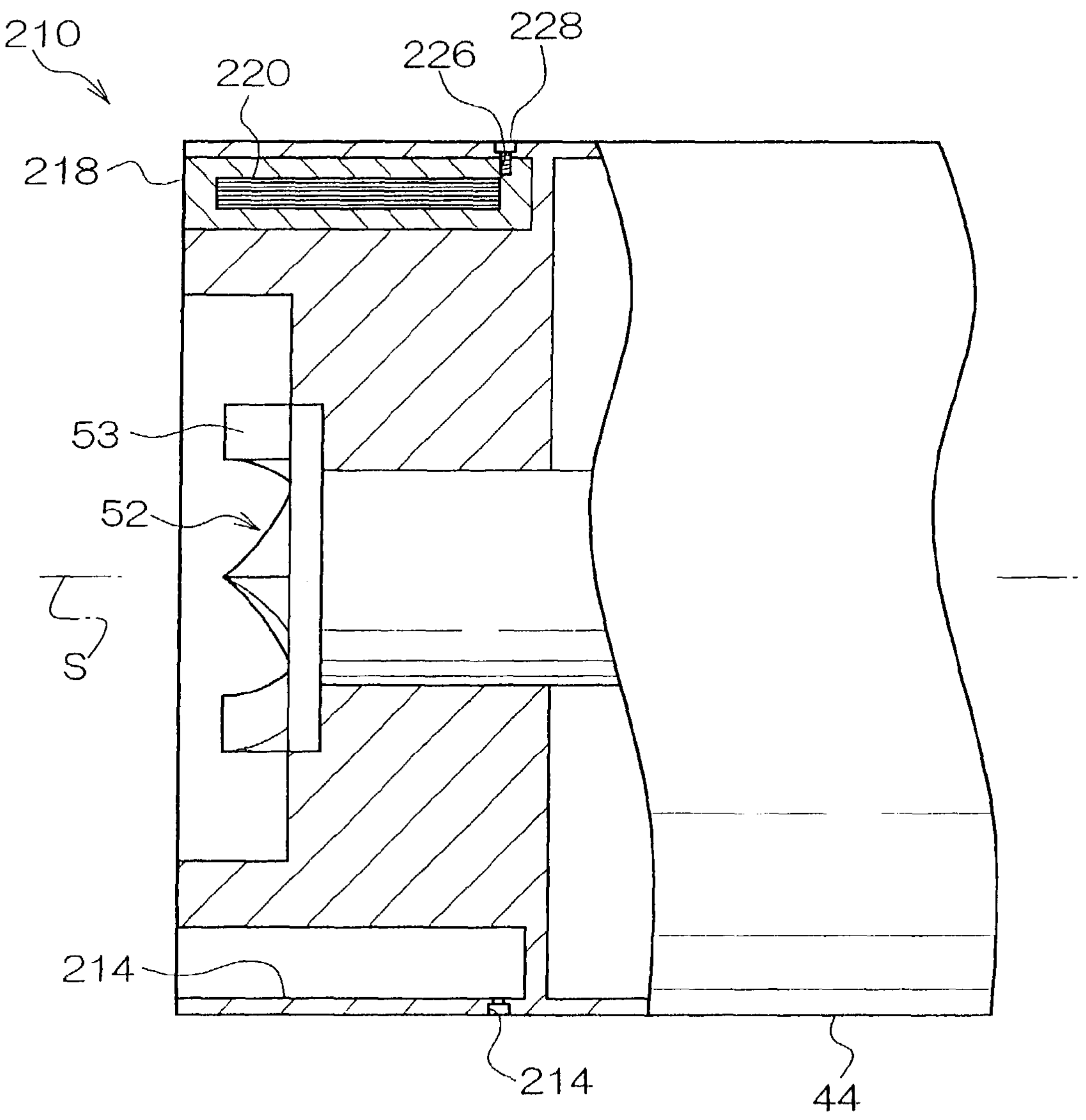
FIG. 14 is a sectional view showing a tag accommodating portion and a wireless communication tag in the toner cartridge shown in FIG. 13.

A second modified example of the toner cartridge in the wireless communication system relating to the embodiment of the present invention is illustrated in FIGS. 13 and 14. A toner cartridge 210 is provided with a tag accommodating portion 212 which extends along the peripheral direction at the outer peripheral side of the driven connecting plate 52 and which opens toward the distal end surface of the toner cartridge 210. The tag accommodating portion 212 is disposed between a peripheral wall portion 214 at the distal end side of the tubular body 44, and a tubular portion 216 which is provided coaxially at the inner peripheral side of the peripheral wall portion 214. The tag accommodating portion 212 is formed as an annular space having a predetermined radius of curvature and centered around the axial center S.

A wireless communication tag 218 is formed in the shape of a plate which is substantially rectangular and has a uniform thickness. The wireless communication tag 218 is curved along the longitudinal direction thereof so as to have the same radius of curvature as the tag accommodating portion 212. Here, the thickness of the wireless communication tag 218 is slightly smaller than the width of the tag accommodating portion 212 along the radial direction. A tag antenna 220, which is formed by a metal wire wound in a coil shape, is provided within the wireless communication tag 218. An IC chip 222 is disposed at the central portion of the tag antenna 220. The internal structure of the IC chip 222 is basically the same as that of the IC chip 94 which was described previously on the basis of FIG. 11. Therefore, description of the internal structure of the IC chip 222 will be omitted.

The wireless communication tag 218 is accommodated in the tag accommodating portion 212 in a state in which the shorter side direction of the wireless communication tag 218 is parallel to the axial center S. At this time, because the wireless communication tag 218 and the tag accommodating portion 212 are curved at the same radius of curvature, the wireless communication tag 218 is supported so as to be slidable (rotatable) along the inner peripheral surface of the peripheral portion 214 and the outer peripheral surface of the tubular portion 216, within the tag accommodating portion 212 and in the peripheral direction which is centered around the axial center S.

As shown in FIG. 13, slit-shaped insert-through grooves 224 which extend in the peripheral direction are formed in the peripheral wall portion 214 of the tubular body 44. The insert-through grooves 224 are provided so as to be discontinuous along the peripheral direction, and are provided to include at least regions corresponding respectively to the cartridge loading portions 96, 98, 100, 102. On the other hand, as shown in FIG. 14, a screw hole 226, which opens to face the insert-through groove 224, is formed in the wireless communication tag 218.

When the wireless communication tag 218 which is inserted in the tag accommodating portion 212 is to be fixed, the position of the wireless communication tag 218 is adjusted, along the peripheral direction, to a position corresponding to one of the cartridge loading portions 96, 98, 100, 102. Thereafter, a screw 228 for fixing is screwed-in into the screw hole 226 of the wireless communication tag 218 through the insert-through groove 224, and the screw 228 is tightened with a sufficient fastening torque. In this way, a sufficiently large frictional force arises between the outer peripheral surface of the wireless communication tag 218 and the inner peripheral surface of the peripheral wall portion 214, and the wireless communication tag 218 is reliably fixed within the tag accommodating portion 212.

When the toner cartridge 210 illustrated in FIG. 13 is applied to the wireless communication system 128 relating to the present embodiment, the positions of the wireless communication tags 218, which are inserted in the tag accommodating portions 212 of the toner cartridges 210, are selectively adjusted to positions corresponding to the cartridge loading portions 96, 98, 100, 102, and the wireless communication tags 218 are fixed by the screws 228. In this way, in the state in which the four toner cartridges 210 housing the respectively different toners are loaded in the cartridge loading portions 96, 98, 100, 102, the positions of the wireless communication tags 218 disposed at the respective toner cartridges 210 can be adjusted such that the wireless communication tags 218 are substantially parallel to and sufficiently close to the main body antennas 124 of the antenna units 118, 120. Thus, the communication by radio waves between the wireless communication tags 218 attached to the four toner cartridges 210 and the wireless communication device 130 provided at the device main body, and the supply of electric power to the IC chips 208, can be carried out stably via the tag antennas 220 and the main body antennas 124.

Further, a common structure and configuration can be used for the respective toner cartridges 210 which are loaded in the cartridge loading portions 96, 98, 100, 102. Thus, the cost of manufacturing the toner cartridges 210 can be reduced, and the work by the manufacturer or the like for recycling the toner cartridges 210 after they have been used is facilitated. Moreover, merely by loosening the screws 228, the positions of the wireless communication tags 218 in the peripheral direction can be adjusted, and the wireless communication tags 218 can be removed from the toner cartridges 210. Thus, the recycling work can be carried out even more easily than with the toner cartridges 36, 38, 40, 42 and the toner cartridges 200.

In the present embodiments, only cases were described in which the wireless communication system 128 relating to the present embodiment is used in communication between the wireless communication device 130 provided at the device main body of the laser printer 10, and the toner cartridges 36, 38, 40, 42, 200, 210. However, wireless communication tags may be attached, in addition to these toner cartridges, to process units which contain one or more process parts and an electrophotographic photosensitive body which can be attached to and removed from the device main body of the laser printer 10, and to process parts such as an electrophotographic photosensitive body, a cleaning device, a charging device, a charge removing device, a developing device, and the like. Communication by radio waves can be carried out between the wireless communication device of the device main body and such process units, process parts, and the like, and various types of data can be written on and read from the wireless communication tags.

The basic structure of the wireless communication system relating to the present embodiment can be applied to various types of image forming devices other than laser printers, such as, for example, facsimile devices which form images by using an electrophotographic process, multifunction devices which form images by using an electrophotographic process and in which a printer, a facsimile device and the like are integrated, and the like. Moreover, the basic structure of the wireless communication system can be applied to image forming devices which form images without using an electrophotographic process, such as inkjet printers, thermal printers, and the like. Wireless communication tags can be attached to cartridge parts which are attached to and removed from the device main body, such ink cartridges, ink ribbon cartridges, and the like.

As described above, in accordance with the wireless communication system and the image forming device relating to the present invention, tag attaching portions at cartridge parts loaded in different cartridge loading portions in a device main body can be made to have common configurations and structures, and the position of a wireless communication tag at a cartridge part can easily be adjusted to a position suited for communication with a main body antenna.

What is claimed is:

1. A wireless communication system comprising:

a device having a device main body having a plurality of antennas;

a plurality of cartridge loading portions provided at the device main body; and a plurality of cartridge parts removably loadable in the cartridge loading portions, wherein each of the plurality of cartridge parts have substantially the same configuration, each of the plurality of cartridge parts has a wireless communication tag, the wireless communication tags of the plurality of cartridge parts each being disposed at different positions;

one set of the plurality of cartridge parts being loaded in upper and lower positions relative to each other and directly sandwiching around at least a first of the plurality of antennas of the device main body;

another set of the plurality of cartridge parts loaded in right and left positions relative to each other and directly sandwiching around at least a second of the plurality of antennas of the device main body: and the first and the second of the plurality of antennas transmit and receive information with the wireless communication tags of the sets of the plurality of cartridge parts which sandwich the first and the second of the plurality of antennas, respectively, wherein said one set of the plurality of cartridge parts is horizontal, and said another set of the plurality of cartridge parts is vertical, an end of said one set of the plurality of cartridge parts is adjacent to an end of said another set of the plurality of cartridge parts.

2. The wireless communication system of claim 1, wherein the plurality of cartridge parts include four parts.

3. The wireless communication system of claim 1, wherein each of the wireless communication tags is capable of attachment to a corresponding cartridge part at a plurality of attaching positions.

4. The wireless communication system of claim 3, wherein the plurality of attaching positions include four identically sized attaching positions within the corresponding cartridge part and on a side of the corresponding cartridge part, the plurality of attaching positions being formed together to create a circular cavity.

5. The wireless communication system of claim 1, wherein the wireless communication tags are of a circular shape on an outer-end and a trapezoidal shape on an inner-end.

6. The wireless communication system of claim 1, further comprising an alarm that emits an alert signal when an improper cartridge part is loaded in the device main body.

* * * * *